United States Patent
Son et al.

(10) Patent No.: US 9,301,292 B2
(45) Date of Patent: Mar. 29, 2016

(54) METHOD OF INDICATING A CONTROL CHANNEL IN A WIRELESS ACCESS SYSTEM, BASE STATION FOR THE SAME AND USER EQUIPMENT FOR THE SAME

(75) Inventors: Hyukmin Son, Anyang-si (KR); Jinmin Kim, Anyang-si (KR); Seunghee Han, Anyang-si (KR); Hyunwoo Lee, Anyang-si (KR); Hyeyoung Choi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 118 days.

(21) Appl. No.: 14/238,145

(22) PCT Filed: Sep. 3, 2012

(86) PCT No.: PCT/KR2012/007042
§ 371 (c)(1),
(2), (4) Date: Feb. 10, 2014

(87) PCT Pub. No.: WO2013/036005
PCT Pub. Date: Mar. 14, 2013

(65) Prior Publication Data
US 2014/0192759 A1 Jul. 10, 2014

Related U.S. Application Data

(60) Provisional application No. 61/531,016, filed on Sep. 5, 2011.

(51) Int. Cl.
*H04W 4/00* (2009.01)
*H04W 72/04* (2009.01)

(52) U.S. Cl.
CPC ........ *H04W 72/042* (2013.01); *H04W 72/0426* (2013.01)

(58) Field of Classification Search
None
See application file for complete search history.

(56) References Cited

U.S. PATENT DOCUMENTS

| | | | |
|---|---|---|---|
| 2012/0106465 A1* | 5/2012 | Haghighat et al. | 370/329 |
| 2012/0106476 A1* | 5/2012 | Song et al. | 370/329 |
| 2013/0017793 A1* | 1/2013 | Henttonen et al. | 455/63.1 |

(Continued)

FOREIGN PATENT DOCUMENTS

JP 2010-171885 8/2010

OTHER PUBLICATIONS

NTT DOCOMO, "On the need for additional carrier types in Rel-11 CA," 3GPP TSG RAN WG1 Meeting #66, R1-112428, Aug. 2011, 4 pages.

(Continued)

*Primary Examiner* — Chi H Pham
*Assistant Examiner* — Soon-Dong D Hyun
(74) *Attorney, Agent, or Firm* — Lee, Hong, Degerman, Kang & Waimey

(57) ABSTRACT

Disclosed are a method of transmitting a control channel in a wireless access system and a base station for the same. In transmitting a control channel of a 1st base station in a wireless communication system, the present invention includes receiving E-PDCCH (enhanced-physical downlink control channel) including a downlink scheduling information in a data region from a 2nd base station, assigning E-PDCCH including a downlink scheduling information of the 1st base station to the data region based on the downlink scheduling information received from the 2nd base station, and transmitting the downlink scheduling information of the 1st base station to the 2nd base station.

16 Claims, 28 Drawing Sheets

Time slot

: ePDCCH for cell edge UE

: ePDCCH for cell inner UE

: Resources for PDSCH

(56) References Cited

U.S. PATENT DOCUMENTS

| | | | |
|---|---|---|---|
| 2013/0065599 A1* | 3/2013 | Chan et al. | 455/446 |
| 2013/0121191 A1* | 5/2013 | Song et al. | 370/252 |
| 2013/0136029 A1* | 5/2013 | Matsuo et al. | 370/252 |
| 2013/0208604 A1* | 8/2013 | Lee et al. | 370/252 |
| 2013/0303179 A1* | 11/2013 | Jitsukawa et al. | 455/450 |
| 2014/0004850 A1* | 1/2014 | Kwon et al. | 455/423 |

OTHER PUBLICATIONS

Fujitsu, "Control Signaling Enhancements for DL-MIMO," 3GPP TSG RAN WG1 Meeting #66, R1-112663, Aug. 2011, 3 pages.

PCT International Application No. PCT/KR2012/007042, Notification of Transmittal of the International Search Report and the Written Opinion of the International Searching Authority, or Declaration dated Feb. 14, 2013, 9 pages.

* cited by examiner

FIG. 20
ABS : normal sub-frame
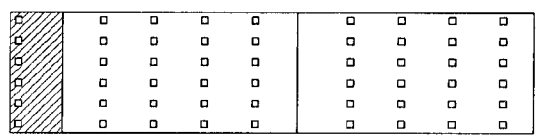
ABS : MBSFN sub-frame

US 9,301,292 B2

METHOD OF INDICATING A CONTROL CHANNEL IN A WIRELESS ACCESS SYSTEM, BASE STATION FOR THE SAME AND USER EQUIPMENT FOR THE SAME

CROSS-REFERENCE TO RELATED APPLICATIONS

This application is the National Stage filing under 35 U.S.C. 371 of International Application No. PCT/KR2012/007042, filed on Sep. 3, 2012, which claims the benefit if U.S. Provisional Application Ser. No. 61/531,016, filed on Sep. 5, 2011, the contents of which are hereby incorporated herein their entirety.

TECHNICAL FIELD

The present invention relates to a wireless communication system, and more particularly, to an operating method in a heterogeneous cell in accordance with ePDCCH (enhanced physical downlink control channel) and apparatus for supporting the same.

BACKGROUND ART

One of the most significant requirements for the next generation wireless access system is the capability of supporting the high data rate requisite. To this end, many ongoing efforts are made to research and develop various technologies including MIMO (multiple input multiple output), CoMP (cooperative multiple point transmission), relay and the like.

In a wireless access system according to a related art, even if an uplink (UL) and a downlink (DL) are set to differ from each other in bandwidth, a single carrier is mainly taken into consideration. For instance, a wireless communication system having UL and DL carriers, each of which number is 1, and UL and DL bandwidths generally symmetric to each other is provided based on a single carrier.

Yet, considering the situation that frequency resources are saturated, as a method of securing broadband bandwidths to meet the higher data transmission rate requirements, CA (carrier aggregation/multiple cells) is introduced in a manner of designing each of scattered bandwidths to operate an independent system and aggregating a plurality of bands into a single system.

In this case, a carrier of an independently operable bandwidth unit is called a component carrier (hereinafter abbreviated CC). In order to support an increasing transmission size, 3GPP LTE-A or 802.16m keeps extending its bandwidth up to 20 MHz or higher. In this case, at least one or more component carriers are aggregated to support the broadband. For instance, if a single component carrier supports a bandwidth of 5 MHz, 10 MHz or 20 MHz, a system bandwidth is supported up to maximum 100 MHz by aggregating maximum 5 component carriers together.

DISCLOSURE OF THE INVENTION

Technical Tasks

Accordingly, the present invention is directed to a method of indicating a control channel in a wireless access system, base station for the same and user equipment for the same that substantially obviate one or more of the problems due to limitations and disadvantages of the related art.

An object of the present invention is to provide a method and apparatus for smoothly transceiving UL/DL data between a user equipment and a base station in a wireless access system, and more preferably, in a component carrier (CA) supportive wireless access system.

When ePDCCH and ePHICH are introduced to reduce influence of interference occurring between homogeneous base stations (or homogeneous networks) or between heterogeneous base stations (or heterogeneous networks), interference influence on PDCCH and PHICH of the related art, and the capacity shortage problem of PDCCH region, another object of the present invention is to provide a system for operating the ePDCCH and the ePHICH, method of indicating the ePDCCH and the ePHICH, and apparatus for the same.

Technical tasks obtainable from the present invention are non-limited the above-mentioned technical task. And, other unmentioned technical tasks can be clearly understood from the following description by those having ordinary skill in the technical field to which the present invention pertains.

Technical Solution

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in transmitting a control channel of a $1^{st}$ base station in a wireless communication system, a method of transmitting the control channel according to one embodiment of the present invention may include the steps of receiving E-PDCCH (enhanced-physical downlink control channel) including a downlink scheduling information in a data region from a $2^{nd}$ base station, assigning E-PDCCH including a downlink scheduling information of the $1^{st}$ base station to the data region based on the downlink scheduling information received from the $2^{nd}$ base station, and transmitting the downlink scheduling information of the $1^{st}$ base station to the $2^{nd}$ base station.

Preferably, the E-PDCCH of the $1^{st}$ base station may be assigned to the data region in a manner of being orthogonal to a resource having the E-PDCCH of the $2^{nd}$ base station assigned thereto.

Preferably, the downlink scheduling information from the $2^{nd}$ base station may be received as a bitmap of a resource block unit in frequency domain or a bitmap of a slot or subframe unit in time domain.

Preferably, in the resource having the E-PDCCH of the $2^{nd}$ base station assigned thereto, the E-PDCCH of the $1^{st}$ base station may be muted instead of being assigned or a user equipment capable of data reception with a low power may be scheduled.

Preferably, if both of the $1^{st}$ base station and the $2^{nd}$ base station are macro base stations, user equipments may be located in outer areas of the $1^{st}$ and $2^{nd}$ base stations.

Preferably, if the $1^{st}$ base station and the $2^{nd}$ base station include a macro base station and a pico base station, respectively, a pico base station based user equipment may be located in an outer area of the pico base station and a macro base station based user equipment may be located within the pico base station.

To further achieve these and other advantages and in accordance with the purpose of the present invention, in transmitting a control channel of a $1^{st}$ base station in a wireless communication system, a method of transmitting the control channel, according to another embodiment of the present invention may include the steps of receiving a semi-static ABRB (almost blank RB) pattern for E-PDCCH (enhanced-physical downlink control channel) of a $2^{nd}$ base station containing a downlink scheduling information in a data region by RRC (radio resource control) and assigning E-PDCCH containing a downlink scheduling information of the $1^{st}$ base station to a corresponding blank data region resource based on the ARBR (almost blank resource block) pattern from the $2^{nd}$ base station.

Preferably, the $1^{st}$ base station may include a macro base station, the $2^{nd}$ base station may include a femto base station, and a macro base user equipment may be located within the femto base station.

To further achieve these and other advantages and in accordance with the purpose of the present invention, a $1^{st}$ base station, of which control channel is transmitted in a wireless communication system, according to another embodiment of the present invention may include a radio frequency unit and a processor configured to control the radio frequency unit, the processor controlling the radio frequency unit to receive E-PDCCH (enhanced-physical downlink control channel) including a downlink scheduling information in a data region from a $2^{nd}$ base station, the processor assigning E-PDCCH including a downlink scheduling information of the $1^{st}$ base station to the data region based on the downlink scheduling information received from the $2^{nd}$ base station, the processor controlling the radio frequency unit to transmit the downlink scheduling information of the $1^{st}$ base station to the $2^{nd}$ base station.

Preferably, the processor may assign the E-PDCCH of the $1^{st}$ base station to the data region in a manner that the E-PDCCH of the $1^{st}$ base station is orthogonal to a resource having the E-PDCCH of the $2^{nd}$ base station assigned thereto.

Preferably, the downlink scheduling information from the $2^{nd}$ base station may be received as a bitmap of a resource block unit in frequency domain or a bitmap of a slot or subframe unit in time domain.

Preferably, in the resource having the E-PDCCH of the $2^{nd}$ base station assigned thereto, the E-PDCCH of the $1^{st}$ base station may be muted instead of being assigned or a user equipment capable of data reception with a low power may be scheduled.

Preferably, if both of the $1^{st}$ base station and the $2^{nd}$ base station are macro base stations, user equipments may be located in outer areas of the $1^{st}$ and $2^{nd}$ base stations.

Preferably, if the $1^{st}$ base station and the $2^{nd}$ base station include a macro base station and a pico base station, respectively, a pico base station based user equipment may be located in an outer area of the pico base station and a macro base station based user equipment may be located within the pico base station.

To further achieve these and other advantages and in accordance with the purpose of the present invention, a $1^{st}$ base station, of which control channel is transmitted in a wireless communication system, according to a further embodiment of the present invention may include a radio frequency unit and a processor configured to control the radio frequency unit, the processor controlling the radio frequency unit to receive a semi-static ABRB (almost blank RB) pattern for E-PDCCH (enhanced-physical downlink control channel) of a $2^{nd}$ base station containing a downlink scheduling information in a data region by RRC (radio resource control), the processor assigning E-PDCCH containing a downlink scheduling information of the $1^{st}$ base station to a corresponding blank data region resource based on the ARBR (almost blank resource block) pattern from the $2^{nd}$ base station.

Preferably, the $1^{st}$ base station may include a macro base station, the $2^{nd}$ base station may include a femto base station, and a macro base user equipment may be located within the femto base station.

It is to be understood that both the foregoing general description and the following detailed description are exemplary and explanatory and are intended to provide further explanation of the invention as claimed.

Advantageous Effects

Accordingly, the present invention provides the following effects and/or advantages.

First of all, according to an embodiment of the present invention, UL/DL data can be smoothly transceived between a user equipment and a base station in a wireless access system, and more preferably, in a component carrier (CA) supportive wireless access system.

Secondly, according to an embodiment of the present invention, influence of interference can be reduced by performing cross subframe scheduling for transmitting control information of a subframe having a considerable influence of interference between homogeneous base stations (networks) or between heterogeneous base stations (or networks) in a subframe having small influence of interference.

Thirdly, according to an embodiment of the present invention, a user equipment is able to improve a cell throughput and reduce a burden put on its implementation due to the reduced interference.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 20 is a diagram for one example of two kinds of ABS types;

BEST MODE

Mode for Invention

Figure 1:
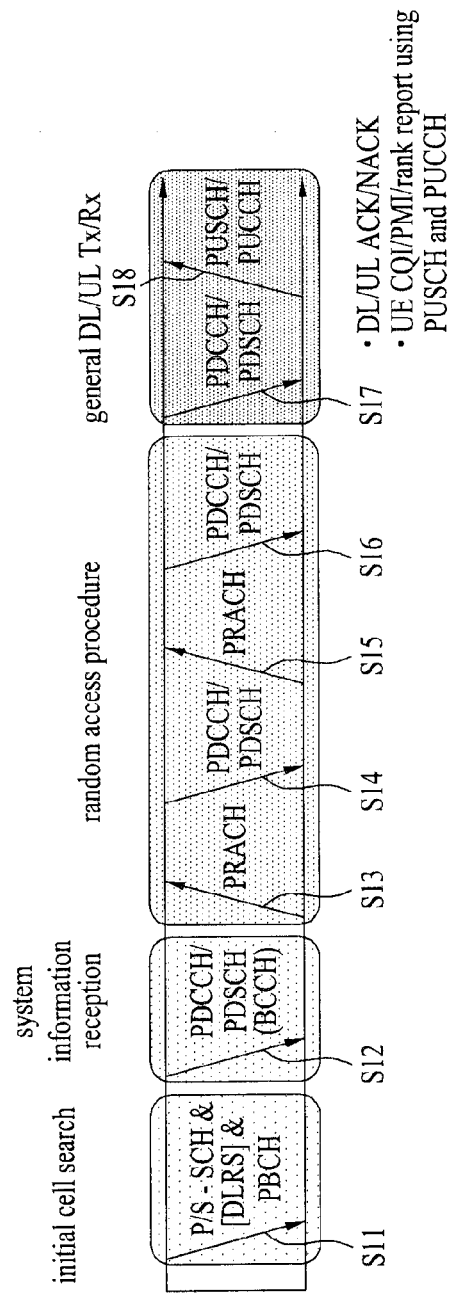
FIG. 1 is a diagram for explaining physical channels used for 3GPP system and a signal transmission using the same.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited.

1. 3GPP LTE/LTE-A System to which the Present Invention is Applicable 1. 1. The General of System FIG. 1 is a diagram for explaining physical channels used for 3GPP system and a signal transmission using the same.

Referring to FIG. 1, if a power of a user equipment is turned on or the user equipment enters a new cell, the user equipment may perform an initial cell search job for matching synchronization with a base station and the like [S11]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S12].

Meanwhile, the user equipment may be able to perform a random access procedure to complete the access to the base station [S13 to S16]. To this end, the user equipment may transmit a specific sequence as a preamble via a physical random access channel (PRACH) [S13] and may be then able to receive a response message via PDCCH and a corresponding PDSCH in response to the random access [S14]. In case of a contention based random access, it may be able to perform a contention resolution procedure such as a transmission S15 of an additional physical random access channel and a channel reception S16 of a physical downlink control channel and a corresponding physical downlink shared channel.

Having performed the above mentioned procedures, the user equipment may be able to perform a PDCCH/PDSCH reception S17 and a PUSCH/PUCCH (physical uplink shared channel/physical uplink control channel) transmission S18 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
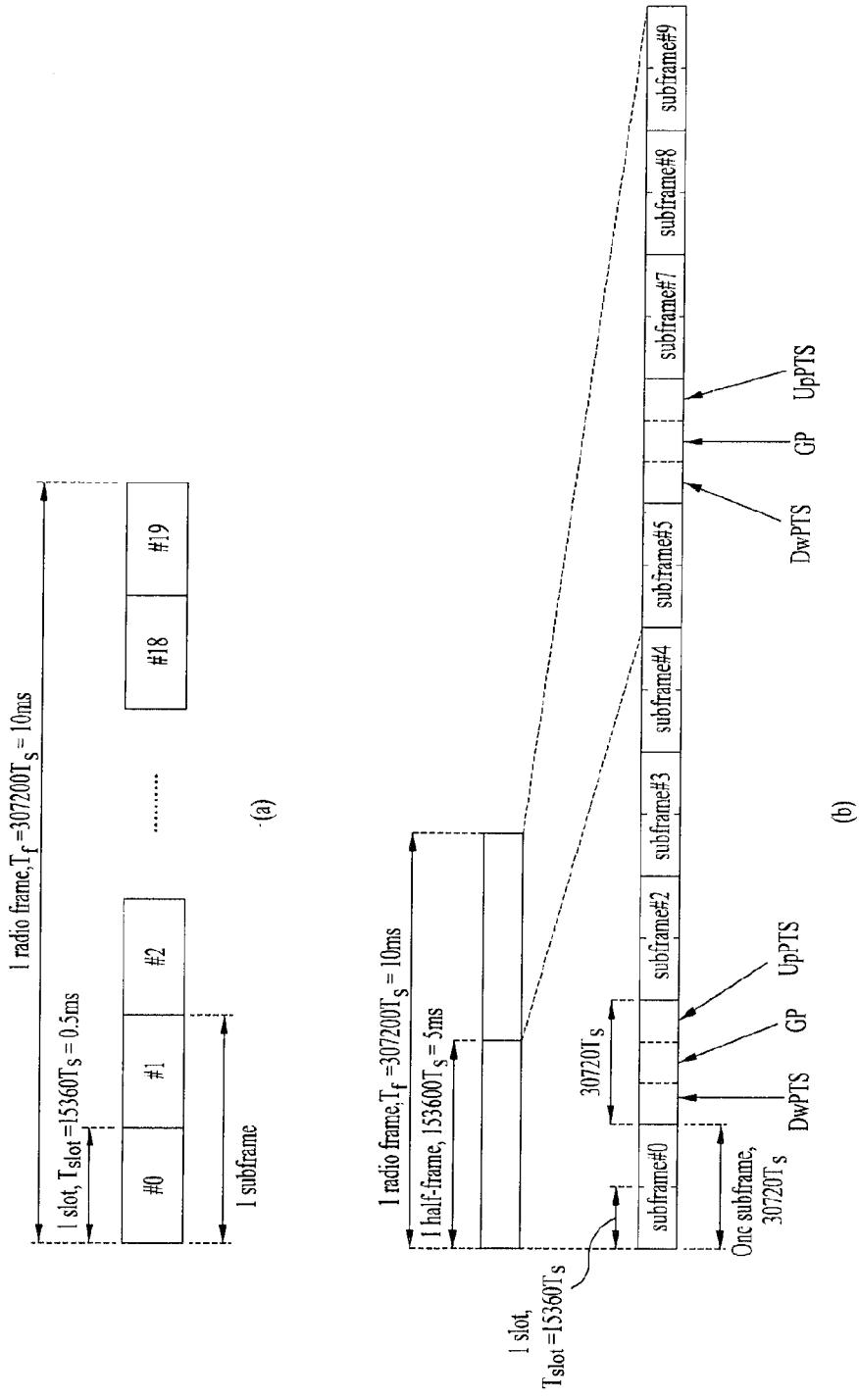
FIG. 2 is a diagram for a structure of a radio frame in 3GPP LTE.

FIG. 2 shows structures of radio frames in 3GPP LTE.

FIG. 2(a) shows a frame structure type 1. This frame structure type 1 may be applicable to both a full duplex FDD (frequency division duplex) system and a half duplex FDD system.

One radio frame has a length of '$T_f = 307200 \cdot T_s = 10$ ms' and is constructed with 20 slots to which indexes 0 to 19 are respectively given with an equal length of '$T_{slot} = 15360 \cdot T_s = 0.5$ ms'. One subframe is defined as two contiguous slots. For example, an $i^{th}$ subframe is constructed with a slot corresponding to '2i' and a slot corresponding to '2i+1'. In particular, a radio frame includes 10 subframes. And, a time taken to transmit one subframe is called a transmission time interval (hereinafter abbreviated TTI). In this case, Ts indicates a sampling time and may be represented as '$T_s = 1/(15\ kHz \times 2048) = 3.2552 \times 10^{-8}$ (i.e., about 33 ns)'. One slot may include a plurality of OFDM or SC-FDMA symbols in time domain and may include a plurality of resource blocks (RBs) in frequency domain.

One slot includes a plurality of OFDM (orthogonal frequency division multiplexing) symbols in time domain. Since 3GPP uses OFDMA in downlink, OFDM symbol is provided to indicate one symbol period. The OFDM symbol may be named one SC-FDMA symbol or symbol period. Resource block (RB) is a resource allocation unit and may include a plurality of contiguous subcarriers in one slot.

In the full duplex FDD system, 10 subframes are simultaneously usable for DL and UL transmissions in each 10 ms interval. In doing so, the UL transmission and the DL transmission are separated from each other in frequency domain. On the contrary, in the half duplex FDD system, a user equipment is unable to perform a transmission and a reception at the same time.

The above-described structure of the radio frame is one example only. And, the number of subframes included in a radio frame, the number of slots included in the subframe and the number of symbols included in the slot may be modified in various ways.

FIG. 2(b) shows a frame structure type 2. The frame structure type 2 is applicable to the TDD system. One radio frame has a length of '$T_f = 307200 \cdot T_s = 10$ ms' and is constructed with 2 half-frames each of which has a length of '$15360 \cdot T_s = 0.5$ ms'. Each of the half-frames is constructed with 5 subframes each of which has a length of '$30720 \cdot T_s = 1$ ms'. For example, an $i^{th}$ subframe is constructed with a slot corresponding to '2i' and a slot corresponding to '2i+1', each of which has a length of '$T_{slot} = 15360 \cdot T_s = 0.5$ ms'. In this case, Ts indicates a sampling time and may be represented as '$T_s = 1/(15\ kHz \times 2048) = 3.2552 \times 10^{-8}$ (i.e., about 33 ns)'.

The type 2 frame includes a special subframe constructed with 3 kinds of fields including DwPTS (downlink pilot time slot), GP (guard period) and UpPTS (uplink pilot time slot). The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

Table 1 shows a configuration (length of DwPTS/GP/UpPTS) of a special frame.

TABLE 1

| | | Normal cyclic prefix in downlink | | | Extended cyclic prefix in downlink | |
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |

TABLE 1-continued

|  | Normal cyclic prefix in downlink | | | Extended cyclic prefix in downlink | | |
| --- | --- | --- | --- | --- | --- | --- |
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In the frame structure type 2, UL-DL configuration indicates that all subframes are assigned to (or reserved for) UL and DL by a prescribed rule. Table 2 shows UL-DL configuration.

TABLE 2

| Uplink-downlink configuration | Downlink-to-Uplink Switch-point periodicity | Subframe number | | | | | | | | | |
| --- | --- | --- | --- | --- | --- | --- | --- | --- | --- | --- | --- |
|  |  | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, in each subframe of a radio frame, 'D' indicates a subframe for DL transmission, 'U' indicates a subframe for UL transmission, and 'S' indicates a special subframe constructed with 3 kinds of fields including DwPTS, GP and UpPTS. UL-DL configurations may be classified into 7 types. And, the respective configurations differ from each other in the positions or number of DL subframes, special frames and UL subframes.

A point of switching DL to UL or a point of switching UL to DL is called a switching point. Switch-point periodicity means a period in which a switching operation between UL and DL subframes is identically repeated and supports both 5 ms and 10 ms. In case of the 5 ms DL-UL switch-point periodicity, a special subframe (S) exists in every half-frame. In case of the 10 ms DL-UL switch-point periodicity, a special subframe (S) exists in a $1^{st}$ half-frame only.

In all configurations, $0^{th}$ subframe, $5^{th}$ subframe and DwPTS are the intervals provided for the DL transmission only. UpPTS and a subframe directly contiguous with a special subframe are the intervals for the UL transmission.

The above-mentioned UL-DL configuration may be known to both a base station and a user equipment. The base station is able to inform the user equipment of the change of the UL-DL assigned state of a radio frame in a manner of transmitting an index of configuration information each time UL-DL configuration information is changed. The configuration information is a sort of DL control information and can be transmitted on PDCCH (physical downlink control channel), which is a DL control channel, like other scheduling information. Moreover, the configuration information is a broadcast information and can be commonly transmitted to all user equipments in a cell on a broadcast channel. In the TDD system, the number of half-frames included in a radio frame, the number of subframes included in the half-frame and the combination of DL and UL subframes are just exemplary.

Meanwhile, in FDD system, HARQ ACK/NACK transmitted to a user equipment on PHICH in an $i^{th}$ subframe is related to PUSCH transmitted by the user equipment in an $(i-4)^{th}$ subframe.

On the other hand, since DL/UL subframe configuration in TDD system differs per UL-DL configuration, PUSCH and PHICH transmission times are set different in accordance with the configuration. And, transmission times of PUSCH and PHICH may be configured different in accordance with an index (or number) of a subframe.

In LTE system, UL/DL timing relations among PUSCH, PDCCH ahead of the PUSCH and PHICH for carrying DL HARQ ACK/NACK corresponding to the PUSCH are determined in advance.

Figure 3:
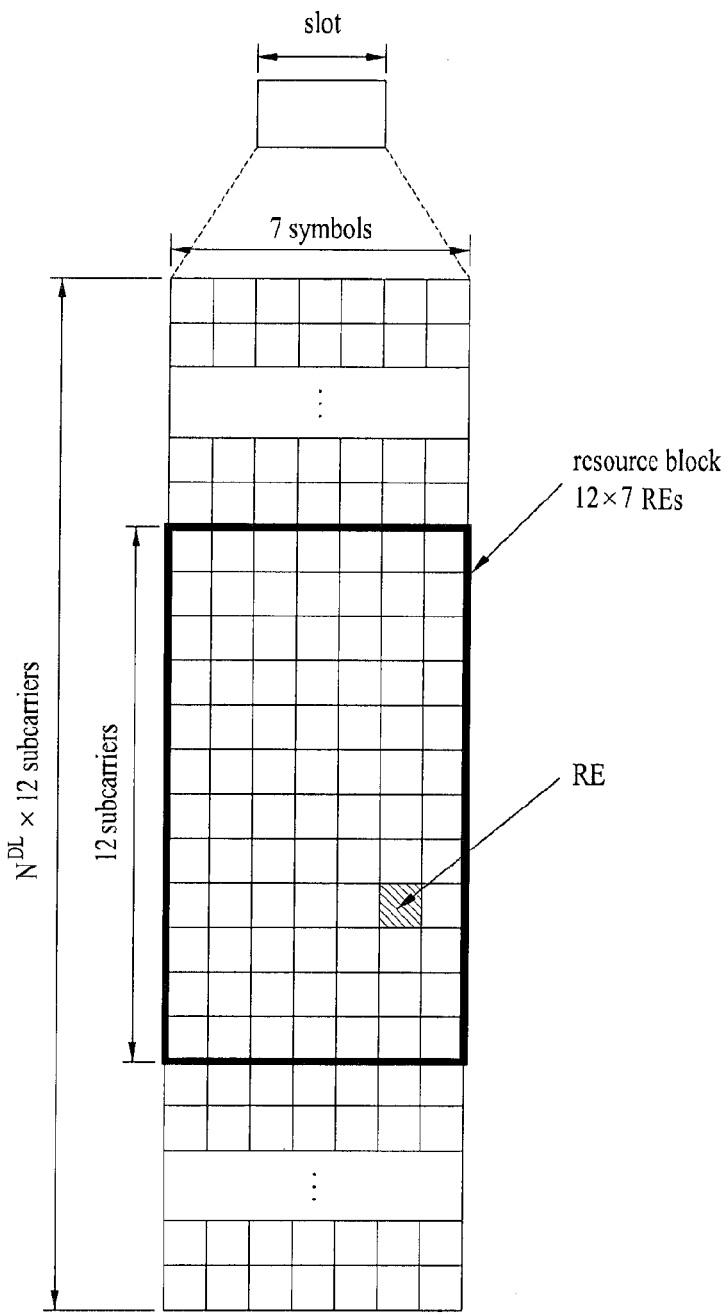
FIG. 3 is a diagram for one example of a resource grid for a downlink slot.

FIG. 3 is a diagram for one example of a resource grid for one downlink (DL) slot.

Referring to FIG. 3, one downlink (DL) slot may include a plurality of OFDM symbols in time domain. In particular, one DL slot exemplarily includes 7 OFDM symbols and one resource block (RB) exemplarily includes 12 subcarriers in frequency domain, by which the present invention may be non-limited.

Each element on a resource grid is called a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
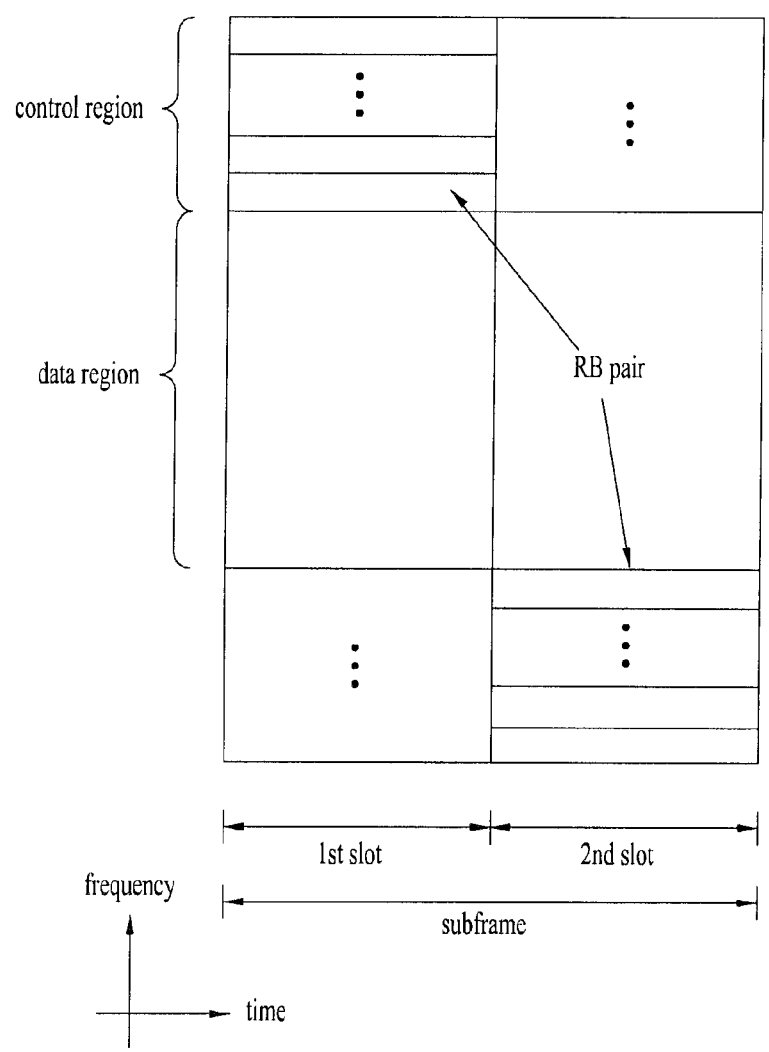
FIG. 4 is a diagram for a structure of an uplink subframe.

FIG. 4 is a diagram for a structure of an uplink (UL) subframe.

Referring to FIG. 4, a UL subframe may be divided into a control region and a data region in frequency domain. A physical UL control channel (PUCCH), which carries UL control information, is allocated to the control region. And, a physical UL shared channel (PUSCH), which carries user data, is allocated to the data region. In order to maintain single carrier property, one user equipment does not transmit PUCCH and PUSCH simultaneously. A resource block pair (RB pair) in subframe is allocated to PUCCH for one user equipment. Resource blocks belonging to the resource block (RB) pair may occupy different subcarriers in each of 2 slots. Namely, a resource block pair allocated to PUCCH is frequency-hopped on a slot boundary.

Figure 5:
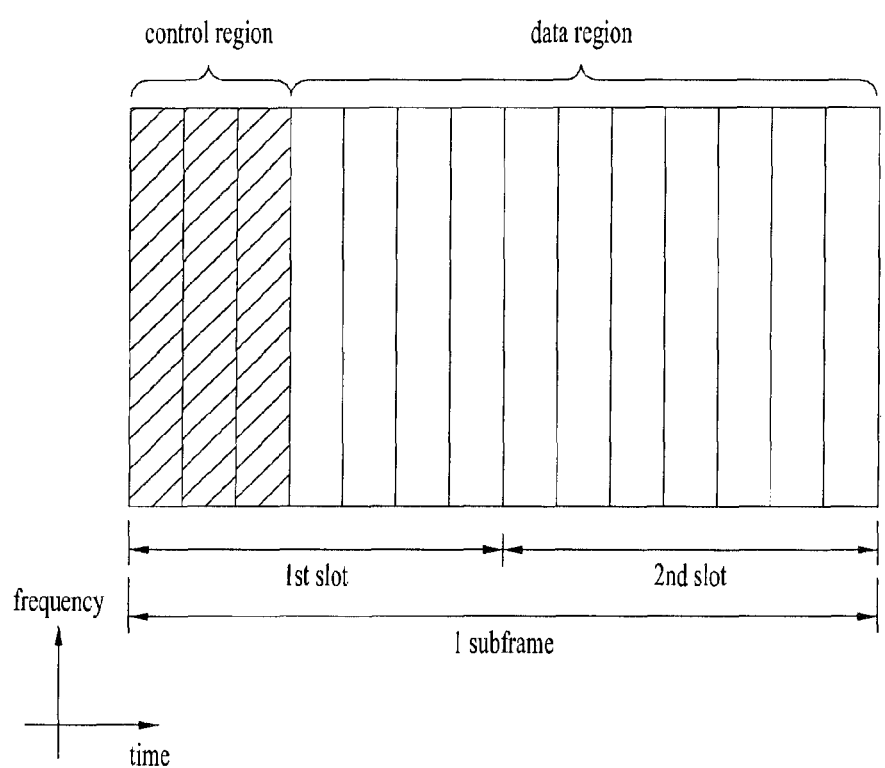
FIG. 5 is a diagram for a structure of a downlink subframe.

FIG. 5 is a diagram for a structure of a downlink (DL) subframe.

Referring to FIG. 5, maximum 3 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols used for a transmission of a control channel within the subframe. The PHICH is a response channel in response to UL and carries ACK/NACK (acknowledgement/non-acknowledgement) signal for HARQ (hybrid automatic repeat request). Control information carried on PDCCH may be called downlink control information (hereinafter abbreviated DCI). The DCI may include UL resource allocation information, DL resource allocation information or a UL transmission (Tx) power control command for a random UE (user equipment) group.

1. 2. PDCCH (Physical Downlink Control Channel)

1. 2. 1. The General of PDCCH

PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). The PDCCH configured with the aggregation of the at least one or more contiguous CCEs undergoes subblock interleaving and may be then transmitted via the control region. CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs.

1. 2. 2. PDCCH Structure

A plurality of PDCCHs multiplexed for a plurality of user equipments can be transmitted in a control region. PDCCH is configured with one CCE or the aggregation of at least 2 contiguous CCEs [CCE aggregation]. In this case, the CCE means a unit corresponding to 9 sets of REGs each of which is configured with 4 resource elements. And, 4 QPSK (quadrature phase shift keying) symbols are mapped to each of the REGs. Resource elements occupied by RS (reference signal) are not included in the REG. In particular, the total number of REGs in OFDM symbol may vary by depending on whether a cell-specific reference signal exists. The concept of REG for mapping 4 resource elements to one group may apply to other DL control channels (e.g., PCFICH, PHICH, etc.). Assuming that REG not assigned to PCFICH or PHICH is set to $N_{REG}$, the number of CCEs available for a system is represented as $N_{CCE}=\lfloor N_{REG}/9 \rfloor$' and indexes 0 to '$N_{CCE}-1$' are given to the CCEs in order, respectively.

In order to simplify a decoding processor of a user equipment, PDCCH format including n CCEs may start with CCE having an index equal to the multiple of n. In particular, if a CCE index is i, the PDCCH format may start with the CCE that satisfies the equation 'i mod n=0'.

In order to configure a single PDCCH signal, a base station may be able to use CCEs, of which number belongs to {1, 2, 4, 8}. In this case, {1, 2, 4, 8} is called a CCE aggregation level. The number of CCEs used for a transmission of a specific PDCCH is determined by a base station in accordance with a channel state. For instance, a single CCE may be sufficient for a PDCCH provided for a user equipment having a good DL channel state (e.g., a case that the user equipment is located in the vicinity of a base station). On the other hand, in case of a user equipment having a poor channel state (e.g., a case that the user equipment is located on a cell edge or boundary), 8 CCEs may be required for sufficient robustness. Besides, a power level of PDCCH may be adjusted in a manner of being matched to the channel state.

Table 3 shows PDCCH format, in which 4 kinds of PDCCH formats are supported in accordance with CCE aggregation levels.

TABLE 3

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

User equipments differ from each other in CCE aggregation level. This is because a format or MCS (modulation and coding scheme) level of control information carried on PDCCH is different. In this case, the MCS level means a code rate used for data coding and a modulation order. An adaptive MCS level is used for a link adaptation. Generally, in a control channel for transmitting control information, 3 or 4 MCS levels may be taken into consideration.

In the following description, PDCCH is explained in detail. First of all, control information carried on PDCCH may be called downlink control information (DCI). A configuration of information loaded on PDCCH payload may vary in accordance with DCI format. In this case, the PDCCH payload may mean information bit(s). Table 4 shows DCI in accordance with DCI format.

TABLE 4

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |

TABLE 4-continued

| DCI Format | Description |
|---|---|
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

Referring to Table 4, DCI formats may include a format 0 for PUSCH scheduling, a format 1 for scheduling of one PDSCH codeword, a format 1A for compact scheduling of one PDSCH codeword, a format 1C for very compact scheduling of DL-SCH, a format 2 for PDSCH scheduling in closed-loop spatial multiplexing mode, a format 2A for PDSCH scheduling in open-loop spatial multiplexing mode, a format 3 for a transmission of a TPC (transmission power control) command for a UL channel, and a format 3A for a transmission of a TPC (transmission power control) command for a UL channel. Moreover, a DCI format 1A is usable for PDSCH scheduling despite that any kind of transmission mode is set for a user equipment.

PDCCH payload length may vary in accordance with DCI format. A PDCCH payload type and a length thereof may vary in accordance with a presence or non-presence of a compact scheduling, a transmission mode configured for a user equipment, or the like.

The transmission mode may be configured in order for a user equipment to receive DL data on PDSCH. For instance, the DL data on PDSCH may include scheduled data for a user equipment, paging, random access response, broadcast information via BCCH and the like. The DL data on PDSCH is related to the DCI format signaled via PDCCH. The transmission mode may be semi-statically configured by an upper layer signaling (e.g., RRC (radio resource control) signaling, etc.). The transmission mode may be categorized into a single antenna transmission and a multi-antenna transmission. A transmission mode is semi-statically configured for a user equipment by the upper layer signaling. For instance, the multi-antenna transmission may include transmit diversity, open-loop spatial multiplexing, closed-loop spatial multiplexing, MU-MIMO (multiuser-multiple input multiple output), beamforming or the like. The transmit diversity is the technology of raising transmission reliability by transmitting the same data via multiple transmitting antennas. The spatial multiplexing is the technology of transmitting high-speed data without increasing a bandwidth of a system by simultaneously transmitting different data via multiple transmitting antennas. The beamforming is the technology of increasing SINR (signal to interference plus noise ratio) by adding a weight in accordance with a channel state at multi-antenna.

DCI format depends on a transmission mode configured in a user equipment. The user equipment has a reference DCI format of monitoring in a transmission mode configured on its own. The transmission mode configured in the user equipment may correspond to one of 7 transmission modes as follows.
(1) Single antenna port: Port 0
(2) Transmit diversity
(3) Open-loop spatial multiplexing
(4) Closed-loop spatial multiplexing
(5) Multi-user MIMO
(6) Closed-loop rank=1 precoding
(7) Single antenna port: Port 5

1. 2. 3. PDCCH Transmission

A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Subsequently, the base station creates coded data by performing channel coding on the CRC attached control information. In doing so, the channel coding may be performed at a code rate in accordance with an MCS level. The base station performs a rate matching in accordance with a CCE aggregation level assigned to PDCCH format and then generates modulated symbols by modulating the coded data. In doing so, it may be able to use a modulation sequence in accordance with an MCS level. The modulated symbols configuring one PDCCH may have a CCE aggregation level set to one of 1, 2, 4 and 8. Thereafter, the base station maps the modulated symbols to physical resource elements [CCE to RE mapping].

1. 2. 4. Blind Decoding

A plurality of PDCCHs can be transmitted in a single subframe. In particular, a control region of one subframe is configured with a plurality of CCEs having indexes set to 0 to ($N_{CCE,k}-1$). In particular, the $N_{CCE,k}$ means the total number of CCEs in a control region of $k^{th}$ subframe. A user equipment monitors a plurality of PDCCHs in each subframe. In this case, the verb 'monitor' means that the user equipment attempts decoding of each of the PDCCHs in accordance with a monitored PDCCH format. In a control region assigned within a subframe, a base station does not provide information indicating where a PDCCH corresponding to the user equipment is located. In order to receive a control channel transmitted from the base station, since the user equipment is unable to know that its PDCCH is transmitted in a specific DCI format or on a specific CCE aggregation level at a specific position, the user equipment finds its PDCCH by monitoring an aggregation of PDCCH candidates in a subframe. This is called a blind decoding/detection (BD). According to the blind decoding, a user equipment takes its UE ID (user equipment identifier) from a CRC part by demasking and then confirms whether the corresponding PDCCH is a control channel of the user equipment by checking CRC error.

In an active mode, a user equipment monitors PDCCH of every subframe to receive data transmitted to it. In DRX mode, a user equipment wakes up in a monitoring interval of each DRX period and then monitors PDCCH in a subframe corresponding to the monitoring interval. In doing so, a subframe for monitoring PDCCH is called a non-DRX subframe.

The user equipment should perform blind decoding on all CCEs existing in a control region of the non-DRX subframe on order to receive PDCCH transmitted to the user equipment. Since the user equipment does not know which PDCCH format will be received, it should decode all PDCCHs on possible CCE aggregation levels in every non-DRX subframe until succeeding in the blind decoding of PDCCHs. Moreover, since the user equipment does not know how many CCEs will be used by the PDCCH for the user equipment, the user equipment should attempt detection on all possible CCE aggregation levels until succeeding in the blind decoding of PDCCH.

In LTE system, a concept of a search space (SS) is defined for a blind decoding performed by a user equipment. A search space means a PDCCH candidate set to be monitored and may have a size different in accordance with each PDCCH format. The search space may be configured with a common search space (CSS) and a UE-specific/dedicated search space (USS). In case of the common search space, all user equipments may be able to know a size of the common search space. On the other hand, the UE-specific search space may be individually set for each user equipment. Hence, a user equipment should monitor both of the UE-specific search space and the common search space to decode PDCCH, thereby performing the blind decoding (BD) in a single frame 44 times to the maximum. In doing so, the blind decoding performed in accordance with a different CRC value (e.g., C-RNTI, P-RNTI, SI-RNTI, RA-RNTI) is not included.

Due to a small search space, it may happen that a base station is unable to reserve CCE resources enough to transmit PDCCH to all user equipments attempting to transmit PDCCH in a given subframe. This is because resources remaining after assignment of CCE positions may not be included in a search space of a specific user equipment. In order to minimize this barrier that may be kept in a next subframe, a UE-specific hopping sequence may apply to a start point of the UE-specific search space.

Table 5 shows sizes of a common search space and a UE-specific search space.

TABLE 5

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In order to reduce a calculation load of a user equipment due to a blind decoding attempt count, a user equipment does not perform searches in accordance with all the defined DCI formats at the same time. In particular, the user equipment always searches a UE-search space for DCI format 0 and DCI format 1A. In doing so, although the DCI format 0 and the DCI format 1A are equal to each other in size, the user equipment is able to identify DCI formats using flags used to identify the DCI format 0 and the DCI format 1A included in PDCCH [Flags for format 0/format 1A differentiation]. Moreover, DCI formats other than the DCI format 0 or the DCI format 1A may be requested to the user equipment. For example, the requested DCI formats may include DCI format 1, DCI format 1B and DCI format 2.

A user equipment may be able to search a common search space for DCI format 1A and DCI format 1C. Moreover, the user equipment may be set to search for DCI format 3 or DCI format 3A. In this case, although the DCI format 3/A may have the same size of the DCI format 0/1A, the user equipment may be able to identify a DCI format using CRC scrambled by an identifier other than a UE-specific identifier.

Search space $S_k^{(L)}$ means a PDCCH candidate set in accordance with an aggregation level $L \in \{1,2,4,8\}$. CCE in accordance with a PDCCH candidate set m of the search space may be determined by Formula 1.

$$L \cdot \{(Y_k + m) \bmod \lfloor N_{CCE,k}/L \rfloor\} + i \quad \text{[Formula 1]}$$

In Formula 1, $M^{(L)}$ indicates the number of PDCCH candidates in accordance with a CCE aggregation level L to be monitored in a search space, where $m = 0, \ldots, M^{(L)} - 1$. The i is an index for designating an individual CCE in each PDCCH candidate in PDCCH and may be represented as 'i=0, ..., L-1'. Moreover, it is $k = \lfloor n_s/2 \rfloor$ and the $n_s$ indicates a slot index within a radio frame.

In order to decode. PDCCH, as mentioned in the foregoing description, a user equipment monitors both a UE-specific search space and a common search space. In this case, the common search space (CSS) supports PDCCHs having the aggregation level of {4, 8}, while the UE-specific search space (USS) supports PDCCHs having the aggregation level of {1, 2, 4, 8}. Table 6 shows PDCCH candidates monitored by a user equipment.

TABLE 6

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Formula 1, in case of a common search space, for two aggregation levels, L=4 and L=8, $Y_k$ is set to 0. On the contrary, in case of a UE-specific search space, for an aggregation level L, $Y_k$ is defined as Formula 2.

$$Y_k = (A \cdot Y_{k-1}) \bmod D \quad \text{[Formula 2]}$$

In Formula 2, it is $Y_{-1} = n_{RNTI} \neq 0$ and indicates a value of $n_{RNTI}$, where A=39827 and D=65537.

2. Carrier Aggregation Environment 2. 1. The General of Carrier Aggregation

Communication environments taken into consideration by embodiments of the present invention include a multicarrier supportive environment. In particular, a multicarrier or CA (carrier aggregation) system used by the present invention means a system that uses at least one component carrier (CC) having a bandwidth smaller than a target band by aggregation in configuring a target broadband to support a broadband.

According to the present invention, multicarrier means aggregation of carriers (or carrier aggregation). In this case, the carrier aggregation means aggregation of non-contiguous carriers as well as aggregation of contiguous carriers. Moreover, the number of component carriers aggregated in DL may be set to different from that of component carriers aggregated in UL. If the downlink component carrier (hereinafter abbreviated DL CC) number and the uplink component carrier (hereinafter abbreviated UL CC) number are equal to each other, it is called a symmetric aggregation. Otherwise, it is called an asymmetric aggregation. The above-mentioned carrier aggregation may be interchangeably substituted with such a terminology as a bandwidth aggregation, a spectrum aggregation and the like.

In the carrier aggregation configured in a manner of combining at least two or more component carriers together, the goal of the LTE-A system is to support bandwidths up to 100 MHz. When at least one carrier having a bandwidth smaller than a target band is combined or aggregated, the bandwidth of the aggregated carrier may be limited to a bandwidth used by a legacy IMT system to secure backward compatibility with the legacy system. For instance, a legacy 3GPP LTE system supports bandwidths of {1.4, 3, 5, 10, 15, 20} MHz and a 3GPP LTE-advanced (LTE-A) system may be configured to support a bandwidth greater than 20 MHz for compatibility with the legacy system using the above bandwidths only. Moreover, a carrier aggregation system of the present invention may be configured to support carrier aggregation by defining a new bandwidth irrespective of bandwidths used by a legacy system.

LTE-A system uses the concept of a cell to manage radio resources. The above-mentioned carrier aggregation environment may be called a multi-cell environment (environment of multiple cells). A cell is defined as a combination of a pair of a DL resource (DL CC) and a UL resource (UL CC). Yet, the UL resource is not a necessary element. Hence, the cell may be configured with a DL resource only or both a DL resource and a UL resource. In case that a specific user equipment has one configured serving cell only, it may have one DL CC and one UL CC. Yet, in case that a specific user equipment has at least two configured serving cells, the number of DL CCs is equal to the number of the cells but the number of UL CCs may be equal to or smaller than the number of the cells. Alternatively, DL CCs and UL CCs may be configured to the contrary. In particular, in case that a specific user equipment has a plurality of configured serving cells, it may be able to support a carrier aggregation environment in which the number of UL CCs is greater than that of DL CCs. In more particular, carrier aggregation may be understood as aggregation of at least two cells differing from each other in carrier frequency (e.g., center frequency of cell). In this case, the above-mentioned 'cell' should be discriminated from a generally used cell that is an area covered by a base station.

Cells used by LTE-A system may include a primary cell (PCell) and a secondary cell (SCell). PCell and SCell may be used as a serving cell. If a carrier aggregation is not configured for a user equipment in RRC_CONNECTED state or a user equipment does not support a carrier aggregation, there exists one serving cell configured with PCell only. On the other hand, if a carrier aggregation is configured for a user equipment in RRC_CONNECTED state, at least one serving cell may be able to exist. And, PCell and at least one SCell are included in all the serving cells.

Serving cell (e.g., PCell, SCell) may be configured via RRC parameters. In particular, PhysCellId is a physical layer identifier and has an integer value ranging 0 to 503. SCellIndex is a short identifier used to identify SCell and has an integer value ranging 1 to 7. ServeCellIndex is a short identifier used to identify a serving cell (e.g., PCell, SCell) and has a value ranging 0 to 7. A value of 0 is applied to PCell and ScellIndex is previously given to be applied to SCell. In particular, a cell having a smallest cell ID (or a smallest cell index) in ServCellIndex becomes PCell.

The PCell means the cell operating on a primary frequency (or, a primary CC). The PCell is usable for a user equipment to perform an initial connection establishment process or a connection reconfiguration process. The PCell may include a cell indicated in a handover procedure. The PCell may mean the cell becomes a center of a control related communication in the serving cell configured in a carrier aggregation environment. In particular, a user equipment is able to perform a transmission by receiving assignment of PUCCH in its PCell only and is able to use the PCell only in obtaining system information or changing a monitoring procedure. E-UTRAN (evolved universal terrestrial radio access) may change PCell only for a handover procedure in a manner of sending a user equipment supportive of carrier aggregation environment an RRC connection reconfiguration (RRCConnectionReconfiguration) message of an upper layer, which contains mobility control information (mobilityControlInfo).

The SCell may mean the cell operating on a secondary frequency (or, a secondary CC). One PCell is assigned to a specific user equipment, while at least one SCell may be assigned to the specific user equipment. The SCell is configurable only after an RRC connection has been established. And, the SCell may be usable to provide an addition radio resource. PUCCH does not exist in the rest of cells (i.e., SCell) except PCell in the serving cell configured in the carrier aggregation environment. When E-UTRAN adds SCell to a user equipment supportive of a carrier aggregation environment, it may be able to provide all system information related to an operation of a related cell in RRC_CONNECTED state via a dedicated signal. A change of system information may be controlled by a release and addition of a related SCell. In doing so, it may be able to use an RRC connection reconfiguration (RRCConnectionReconfiguration) message of an upper layer. E-UTRAN may perform a dedicated signaling having a parameter differing per user equipment rather than a broadcasting in a related SCell.

After an initial security activating process has started, E-UTRAMN may be able to configure a network including at least one SCell in addition to PCell configured in the early stage of a connection establishment process. In a carrier aggregation environment, PCell or SCell may be able to work as a component carrier. In the following description of embodiments, a primary component carrier (PCC) may be usable as having the same meaning of PCell and a secondary component carrier (SCC) may be usable as having the same meaning of SCell.

Figure 6:
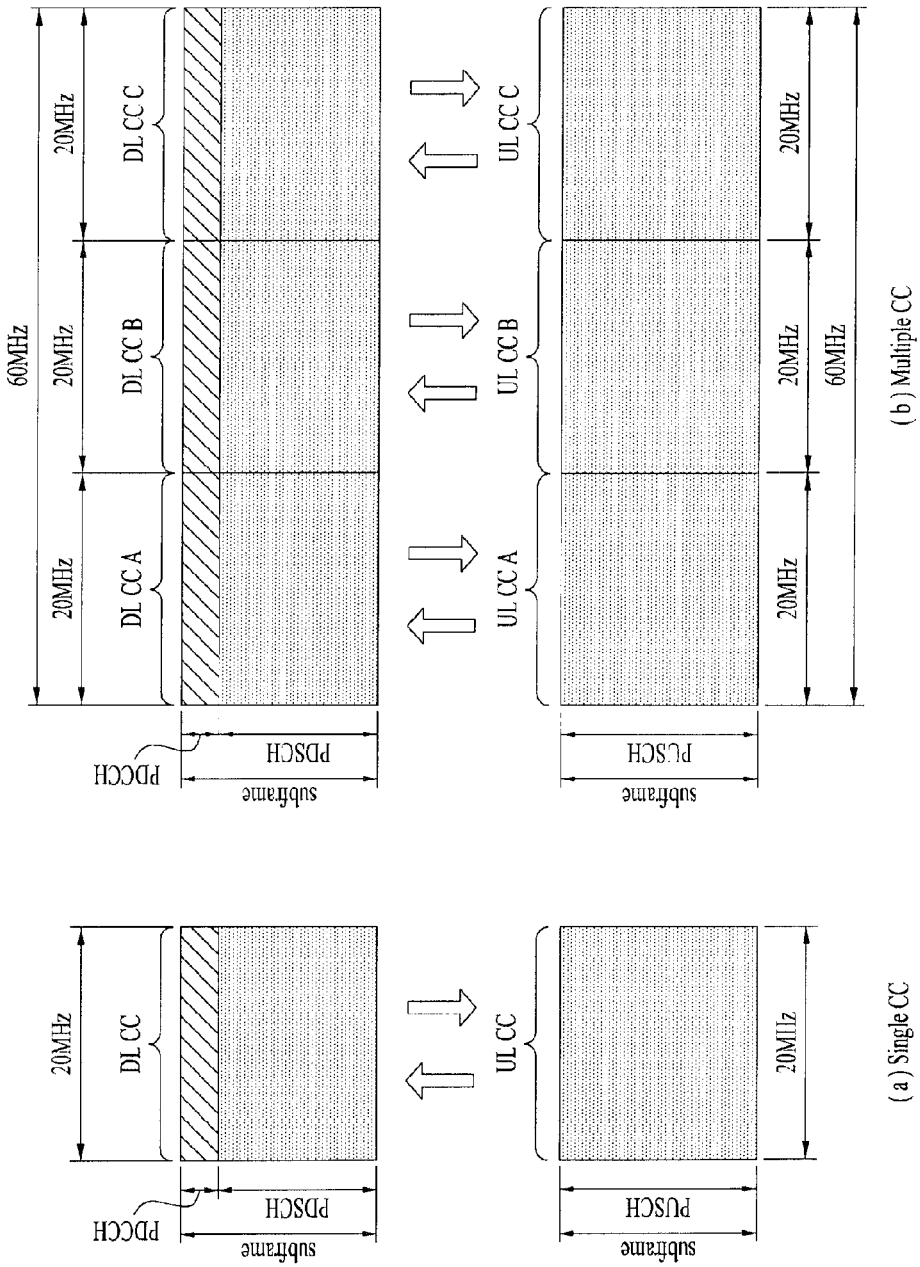
FIG. 6 is a diagram for one example of component carriers of LTE system and carrier aggregation used by LTE-A system.

FIG. 6 is a diagram for one example of component carriers of LTE system and carrier aggregation used by LTE-A system.

FIG. 6(a) shows a single carrier structure used by LTE system. Component carriers include DL CC and UL CC. One component carrier may have a frequency range of 20 MHz.

FIG. 6B shows a carrier aggregation structure used by LTE-A system. Referring to FIG. 6(b), 3 components carriers, each of which has a frequency size of 20 MHz, are aggregated together. 3 DL CCs and 3 UL CCs are present, by which the number of DL CCs or the number of UL CCs may be non-limited. In case of carrier aggregation, a user equipment may be able to monitor 3 CCs at the same time, receive DL signal/data, and transmit UL signal/data.

In case that N DL CCs are managed in a specific cell, a network may be able to assign M DL CCs (where, L M N) to a user equipment. In doing so, the user equipment may be able to monitor the limited M DL CCs only and receive DL signals. Moreover, a network may be able to assign primary DL CC to the user equipment in a manner of prioritizing L DL CCs (where, L≤M≤N). In doing so, the user equipment should monitor the L DL CCs. This mechanism may be exactly applicable to a UL transmission.

A linkage between a carrier frequency (or DL CC) of a DL resource and a carrier frequency (or UL CC) of a UL resource may be indicated by such an upper layer message as an RRC message or a system information. For instance, by a linkage defined by SIB2 (system information block type 2), a combination of DL and UL resources may be configured. In particular, a linkage may mean a mapping relation between a DL CC for transmitting PDCCH carrying a UL grant and a UL CC using the UL grant or a mapping relation between a DL/UL CC for carrying HARQ data and a UL/DL CC for carrying HARQ ACK/NACK signal.

2. 2. Cross Carrier Scheduling

In a carrier aggregation system, a self-scheduling method and a cross carrier scheduling method exist in aspect of carrier or serving cell scheduling. In particular, a cross carrier scheduling may be named a cross component carrier scheduling or a cross cell scheduling.

A self-scheduling means that PDCCH (DL grant) and PDSCH are carried on the same DL CC or that PUSCH transmitted in accordance with PDCCH (UL grant) carried on DL CC is transmitted on UL CC linked with the DL CC having carried the UL grant.

A cross carrier scheduling means that PDCCH (DL grant) and PDSCH are transmitted on different DL CCs, respectively or that PUSCH transmitted in accordance with PDCCH (UL grant) carried on DL CC is transmitted on a different UL CC that is not the UL CC linked with the DL CC having carried the UL grant.

Whether to perform a cross carrier scheduling may be UE-specifically activated or deactivated and may be notified to each user equipment semi-statically via an upper layer signaling (e.g., RRC signaling).

In case that the cross carrier scheduling is activated, PDCCH needs a carrier field indicator (CIF) that indicates that PDSCH/PUSCH indicated by the corresponding PDCCH is carried on which DL/UL CC. For instance, PDCCH is able to assign a PDSCH or PUSCH resource to one of a plurality of component carriers using the CIF. In particular, if PDCCH on DL CC assigns a PDSCH or PUSCH resource to one of multiply aggregated DL/UL CCs, CIF is configured. In this case, DCI format of LTE-A Release-8 may be extended in accordance with CIF. In doing so, the configured CIF is fixed to a 3-bit field or a position of the configured CIF may be stationary irrespective of a DCI format size. Moreover, it may be able to reuse a PDCCH structure of LTE-A Release-8 (e.g., a resource mapping on the basis of the same coding and CCE).

On the other hand, in case that PDCCH on DL CC assigns a PDSCH resource on the same DL CC or a PUSCH resource on a singly linked UL CC, CIF is not configured. In this case, it may be able to use the same PDCCH structure and DCI format of LTE-A Release-8 (e.g., a resource mapping on the basis of the same coding and CCE).

When a cross carrier scheduling is possible, a user equipment needs to monitor PDCCH for a plurality of DCIs in a control region of monitoring CC in accordance with a per-CC transmission mode and/or bandwidth. To support this, a search space configuration and PDCCH monitoring may be required.

In a carrier aggregation system, a UE DL CC set indicates a set of DL CCs scheduled to enable a user equipment to receive PDSCH and a UE UL CC set indicates a set of UL CCs scheduled to enable a user equipment to transmit PUSCH. And, a PDCCH monitoring set indicates a set of at least one DL CC for performing a PDCCH monitoring. The PDCCH monitoring set may be equal to the UE DL CC set or may be a subset of the UE DL CC set. The PDCCH monitoring set may include at least one of DL CCs belonging to the UE DL CC set. Alternatively, the PDCCH monitoring set may be separately defined irrespective of the UE DL CC set. The DL CC included in the PDCCH monitoring set may be configured to always enable a self-scheduling of a linked UL CC. Thus, the UE DL C set, the UE UL CC set and the PDCCH monitoring set may be configured UE-specifically, UE group-specifically or cell-specifically.

In case that the cross carrier scheduling is inactive, it means that a PDCCH monitoring set is always equal to a UE DL CC set. In this case, such an indication as a separate signaling for the PDCCH monitoring set is not necessary. Yet, in case that a cross carrier scheduling is active, it is preferable that a PDCCH monitoring set is defined within a UE DL CC set. In particular, in order to schedule a PDSCH or PUSCH for a user equipment, a base station transmits PDCCH on a PDCCH monitoring set only.

Figure 7:
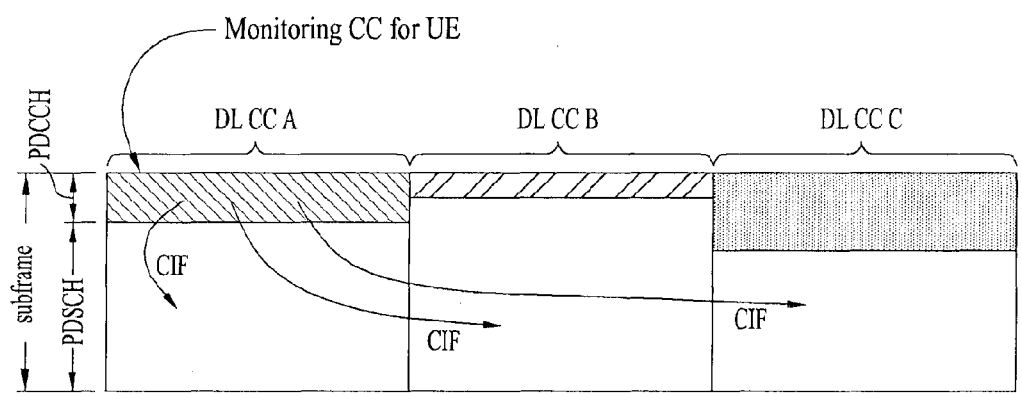
FIG. 7 is a diagram for a subframe structure of LTE-A system in accordance with cross carrier scheduling.

FIG. 7 is a diagram for a subframe structure of LTE-A system in accordance with cross carrier scheduling.

Referring to FIG. 7, a DL subframe for an LTE-A user equipment represents a case that 3 DL CCs are combined and that DL CC 'A' is set as a PDCCH monitoring DL CC. If CIF is not used, each DL CC may be able to transmit a PDCCH for scheduling its PDSCH without the CIF. On the other hand, if a CIF is used via an upper layer signaling, the only DL CC 'A' is able to transmit its PDSCH or a PDCCH for scheduling a PDSCH of another CC using the CIF. In doing so, DL CC 'B' or DL CC 'C', which is not set as the PDCCH monitoring DL CC, does not transmit PDCCH.

3. Interference between Base Stations 3. 1. RNTP (Relative Narrowband Transmit Power)

In a cellular network based wireless communication system, there exists interference between homogeneous base stations (or homogeneous networks) or interference between heterogeneous base stations (or heterogeneous networks). This interference may cause a problem of affecting a control channel as well as a data channel. In the following description, a method for solving this problem is explained.

Figure 8:
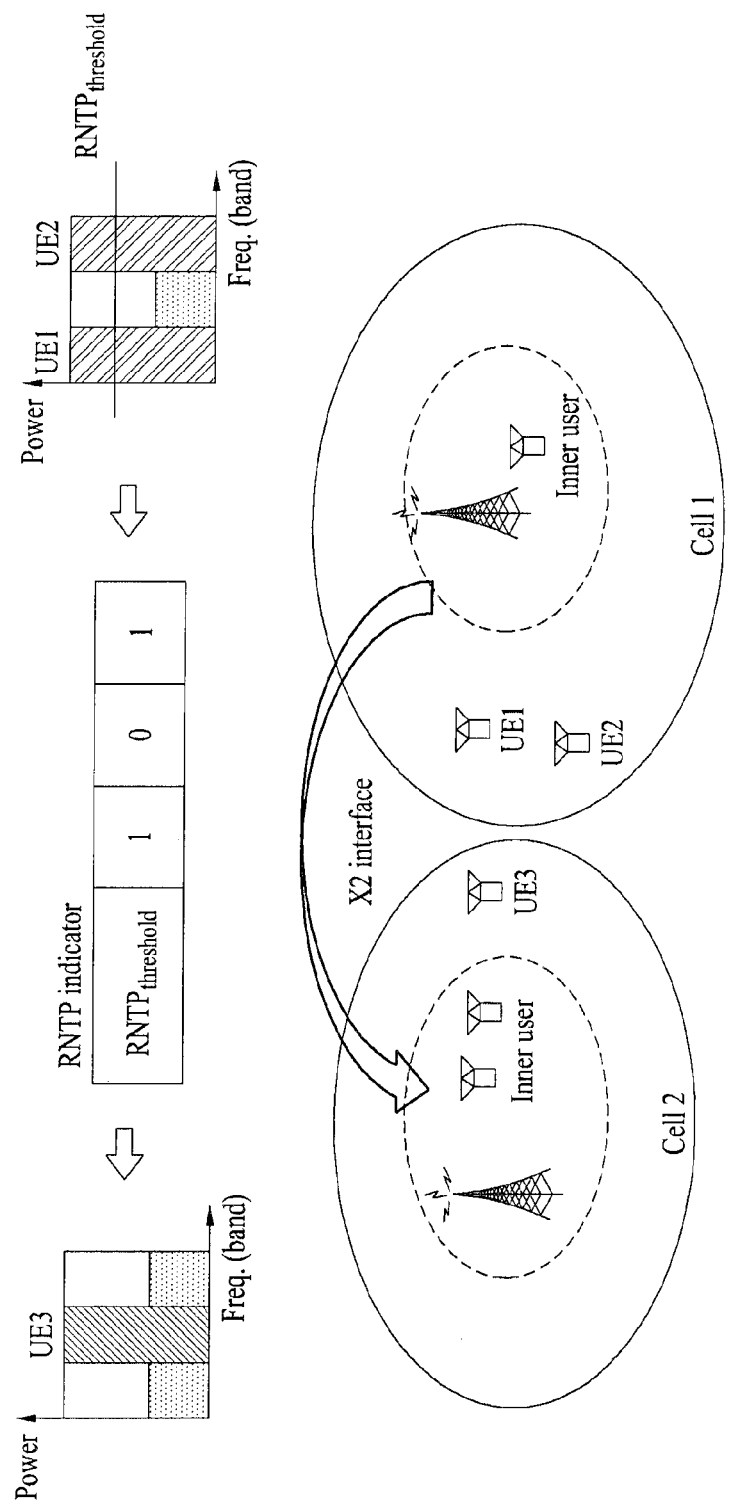
FIG. 8 is a diagram for one example of a use for RNTP.

FIG. 8 is a diagram for one example of a use for RNTP (relative narrowband transmit power).

Referring to FIG. 8, information is exchanged by means of a signaling via X2 interface to reduce interference between macro base stations (or macro eNBs). In DL situation, bitmap information is exchanged using RNTP (relative narrowband transmit power). Each bit of a generated bitmap information corresponds to a bit mapping of RB unit and each bit configuration may follow Formula 3 in the following.

[Formula 3]
$$RNTP(n_{PRB}) = \begin{cases} 0 & \text{if } \frac{E_A(n_{PRB})}{E_{max\_nom}^{(p)}} \leq RNTP_{threshold} \\ 1 & \text{if no promise about the upper limit of } \frac{E_A(n_{PRB})}{E_{max\_nom}^{(p)}} \text{ is made} \end{cases}$$

In Formula 3, $E_A(n_{PRB})$ indicates a maximum EPRE of a UE-specific PDSCH resource element in an OFDM symbol of a physical resource block at an antenna port p not including a reference signal.

[Formula 4]
$$E_{max\_nom}^{(p)} = \frac{P_{max}^{(p)} \cdot \frac{1}{\Delta f}}{N_{RB}^{DL} \cdot N_{SC}^{RB}}$$

If an RNTP threshold value given as Formula 3 or Formula 4 is not exceeded, it may indicate 0. Otherwise, it may indicate 1.

Referring to FIG. 8, if a band on a frequency side is assigned for an outer cell user equipment (UE) 1 and an outer cell user equipment (UE) 2 in a cell 1 of an environment having two cells neighbor to each other in a manner shown in FIG. 8, a bitmap 1 0 1 containing an RNTP threshold is transmitted as an RNTP indicator. The neighbor cell 2 assigns a user equipment (UE) 3 located in its outer cell to a band orthogonal to a frequency band assigned to the user equipment 1 and the user equipment 2 with reference to the corresponding RNTP indicator information (cf. the corresponding band is interpreted as RB). Thus, inter-cell interference can be reduced. In doing so, in case that a frequency resource (RB) is insufficient, it may be difficult to achieve inter-cell orthogonal resource allocation. Therefore, this technique helps mutual interference to decrease as far as possible.

3. 2. Use for HII (High Interference Indicator) and OI (Overhead Indicator)

Figure 9:
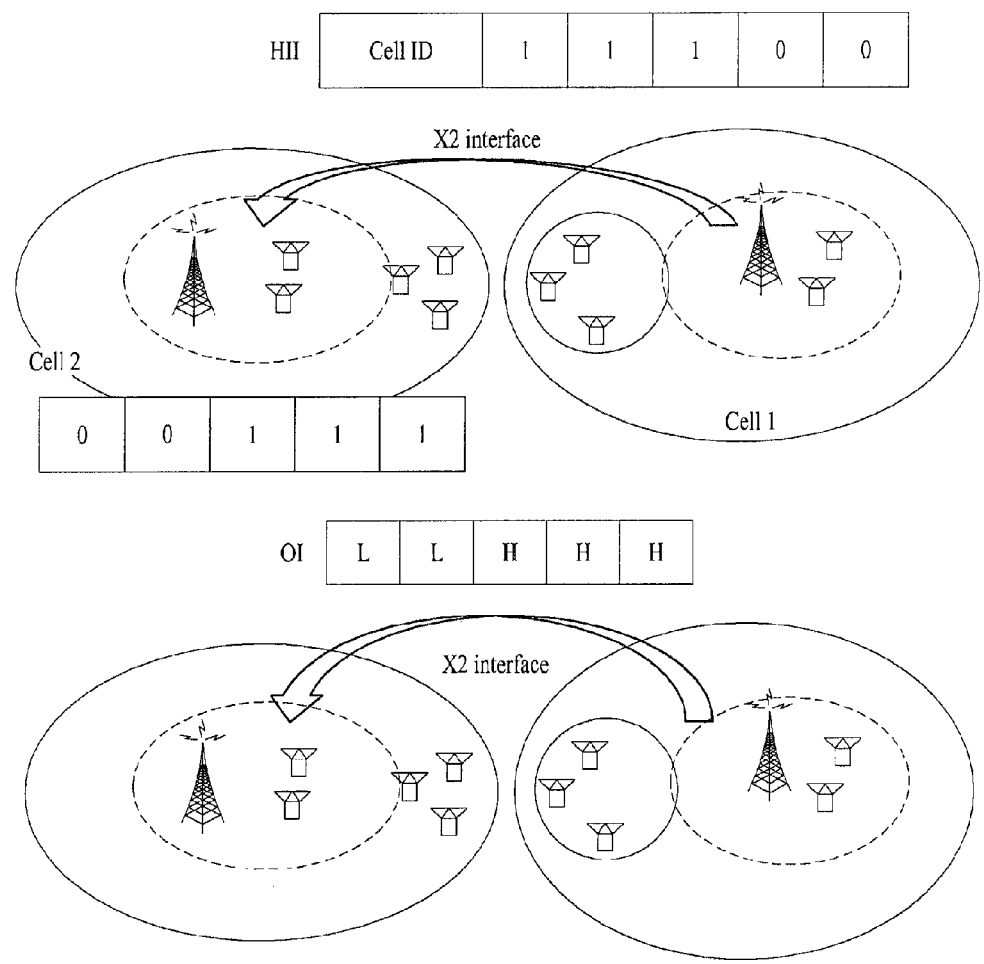
FIG. 9 is a diagram for one example of a use for HII or OI.

FIG. 9 is a diagram for one example of a use for HII or OI.

Referring to FIG. 9, as an X2 interface signaling method for interference reduction in case of UL, there is HII (high interference indicator) or OI (overhead indicator). The HII is a proactive indicator and announces scheduling information on an RB, to which a user located in an outer cell in a UL situation, in a bitmap format.

The OI is a reactive indicator and announces whether interference/noise level in a corresponding RB is low, medium or high by RB unit. A case of using ICIC (inter-cell interference coordination) in UL situation may apply to FIG. 9.

In FIG. 9, in a UL situation, a cell 1 transmits HII of bitmap format containing a cell ID for RB scheduling information assigned to a user located in an outer cell of the cell 1. The meaning of 11100 indicates that an outer cell user is assigned to $1^{st}$ to $3^{rd}$ RBs. In particular, if an outer cell user of a neighbor cell does not use the corresponding RB, it may cause interference. Hence, the corresponding information is sent. The neighbor cell 2 refers to the information to enable its outer cell user to be assigned to a 0-bit situated RB with reference to HII information. Yet, since resource allocation for fully avoiding interference is impossible due to the limited resources, if an outer cell user is assigned to a $3^{rd}$ RB in the cell 2, as shown in the drawing, the cell 1 experiences high interference at the $3^{rd}$ RB. In this case, after duration of prescribed time, information on the severe interference may be set via the OI again. Therefore, this technique transmits information via HII or OI to help mutual interference to decrease as far as possible.

3. 3. Structure of Heterogeneous Network

Figure 10:
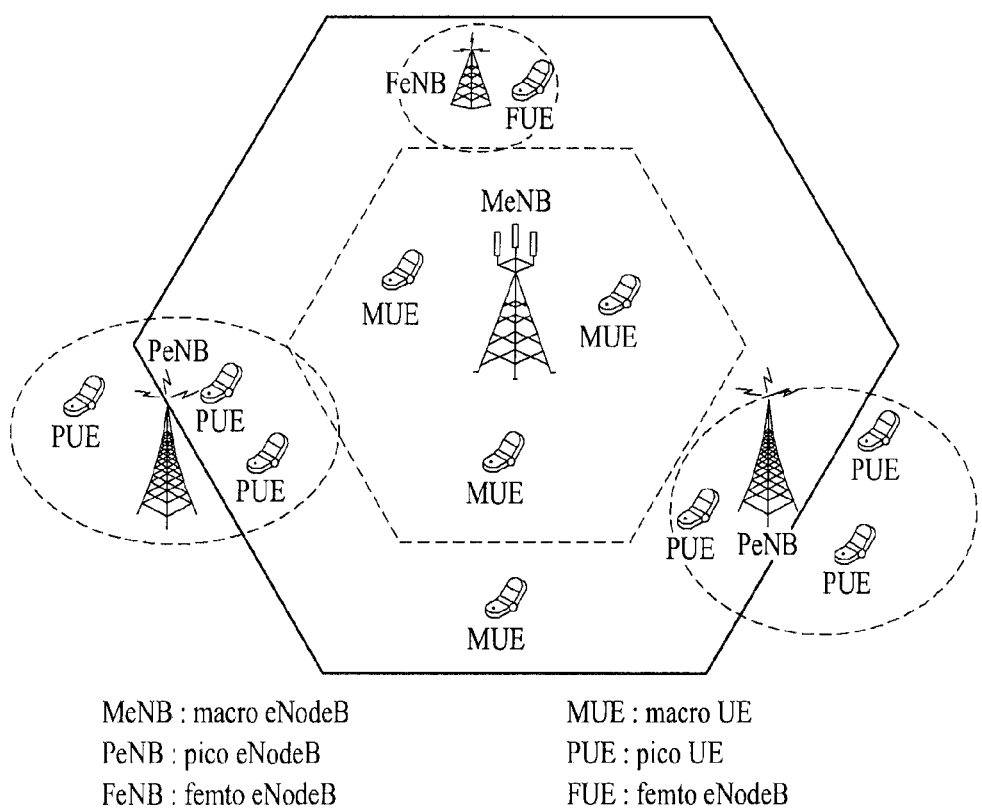
FIG. 10 is a diagram for a structure of a heterogeneous network.

FIG. 10 is a diagram for a structure of a heterogeneous network.

Referring to FIG. 10, in order to stably secure such a data service as a multimedia service and the like in the next generation mobile communication, lots of attractions are paid to a hierarchical cell structure, in which micro cells (e.g., pico cells or femto cells) for low-power/short-range communications coexist on a macro cell based homogeneous network, or a heterogeneous cell structure. This is because additional installation of a macro base station (e.g., macro eNode B) is inefficient in aspect of cost and complexity versus system performance enhancement. A structure of a heterogeneous network in ongoing consideration of a current communication network has the configuration shown in FIG. 10.

3. 4. Measurement Report

Regarding a reporting configuration, a corresponding user equipment reports a measurement value to a corresponding base station (eNB) by one of the following event triggered reporting criteria.

(1) Event A1: Case that a measurement value of a serving cell is better than an absolute threshold value.

(2) Event A2: Case that a measurement value of a serving cell is poorer than an absolute threshold value.

(3) Event A3: Case better than an offset related to a neighbor cell serving cell.

(4) Event A4: Case that a measurement value of a neighbor cell is better than an absolute threshold value.

(5) Event A5: Case that a measurement value of a serving cell is poorer than an absolute threshold value and that a measurement value of a neighbor cell is better than another absolute threshold value.

Figure 11:
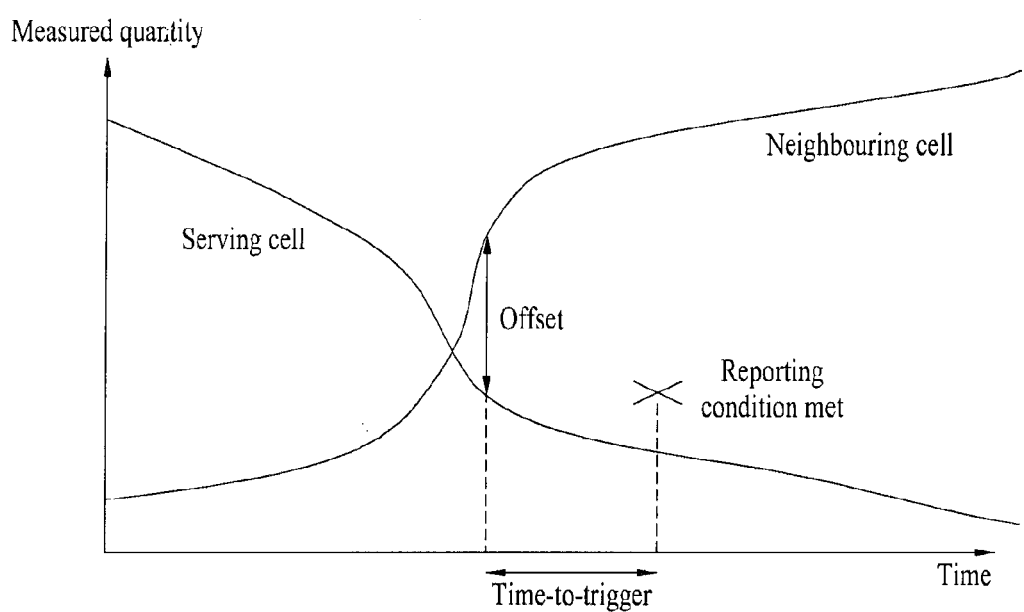
FIG. 11 is a diagram for one example of a case of an event triggered reporting condition A3.

FIG. 11 is a diagram for one example of a case of an event triggered reporting condition A3. In particular, FIG. 11 is a diagram for an event triggered reporting condition corresponding to the event A3. In case that an RSRP value from a serving cell becomes greater than an RSRP from a neighbor cell by a specific offset or more, if a corresponding condition keeps being met after duration of a time-to-trigger that is a predetermined time, the corresponding event is triggered.

3. 5. Cell Range Extension (CRE)

Figure 12:
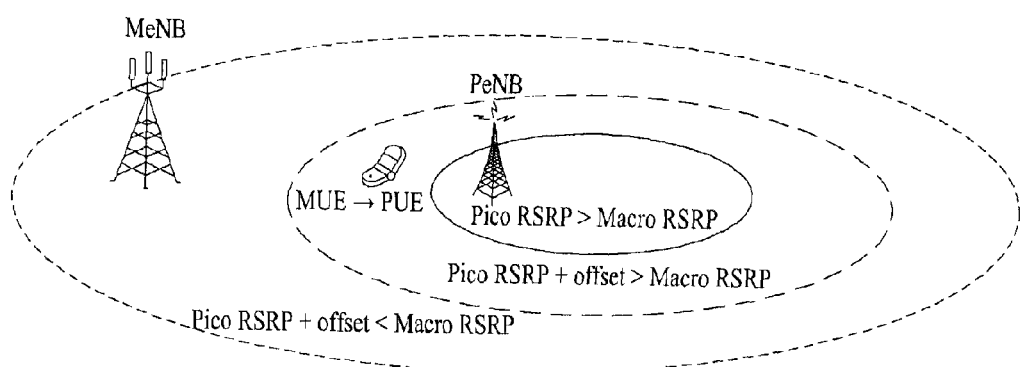
FIG. 12 is a diagram for one example of cell range extension (CRE)

FIG. 12 is a diagram for one example of cell range extension (CRE).

According to the technology of cell range extension, a macro based user equipment, which is located in the vicinity of a pico base station (PeNB) and receives extreme interference from the corresponding pico base station (PeNB), among a plurality of macro based user equipments (MUE) connected to a macro base station (MeNB) in a heterogeneous network structure is made to handover into the pico base station. Through this CRE execution, influence of previous interference can be reduced and a load balancing can be achieved. In case that a serving cell is determined by a single measurement comparison like RSRP, since it is highly probable that an RSRP value from a macro base station having a high transmission power is relatively higher that an RSRP from a pico base station having a low transmission power, it may be difficult for a corresponding macro based user equipment to make a handover into the corresponding pico base station (PeNB). Therefore, in order to smoothly perform the CRE technology, CRE can be performed using the following criterion.

Pico RSRP+Offset>Macro RSRP [Formula 5]

In Formula 5, an offset value is a value configured by an upper layer signaling and enables CRE to be performed on a pico base station (PeNB) having a low transmission power.

Hence, if a sum of a pico RSRP and an offset value is equal to or greater than a macro RSRP, CRE is performed on a pico base station.

3. 6. Assignment of ABS (Almost Blank Subframe)

Heterogeneous network/deployments may mean a structure in which micro cells for low power/short-range communication coexist in a macro cell based homogeneous network. A macro cell (or a macro base station) means a general cell (or base station) of a wireless communication system with a wide coverage and a high transmission power. A micro cell (or a micro base station) is a small version of a macro cell, is able to operate independently by performing most of functions of a macro cell, and means a cell (or a base station) of a non-overlay type which is overlaid within an area covered by a macro cell or a shadow area not covered by the macro cell. The micro cell has a coverage narrower than that of the macro cell and a transmission power lower than that of the macro cell and is able to accommodate user equipments less than those of the macro cell. This micro cell may be named one of a pico cell, a femto cell, an HeNB (home evolved Node B), a relay and the like.

A user equipment may be directly served by a macro cell or may be served by a micro cell. Occasionally, a user equipment existing within a coverage of a micro cell may be served by the macro cell.

In accordance with a presence or non-presence of restriction put on a user equipment, a micro cell may be classified into two types. The $1^{st}$ type means a CSG (closed subscriber group) cell that does not grant an access of a previous macro user equipment (e.g., a user equipment served by a macro cell) or accesses of other micro user equipments (e.g., user equipments served by a micro cell) without authentication. And, the $2^{nd}$ type means an OASC (open access subscriber group) or OSG (open subscriber group) cell that grants an access of a previous macro user equipment or accesses of other micro user equipments.

In a heterogeneous network environment having a macro cell and a micro cell coexist therein, inter-cell interference more serious than that of a homogeneous network environment having a macro cell (or a micro cell) exist therein only may occur.

Figure 13:
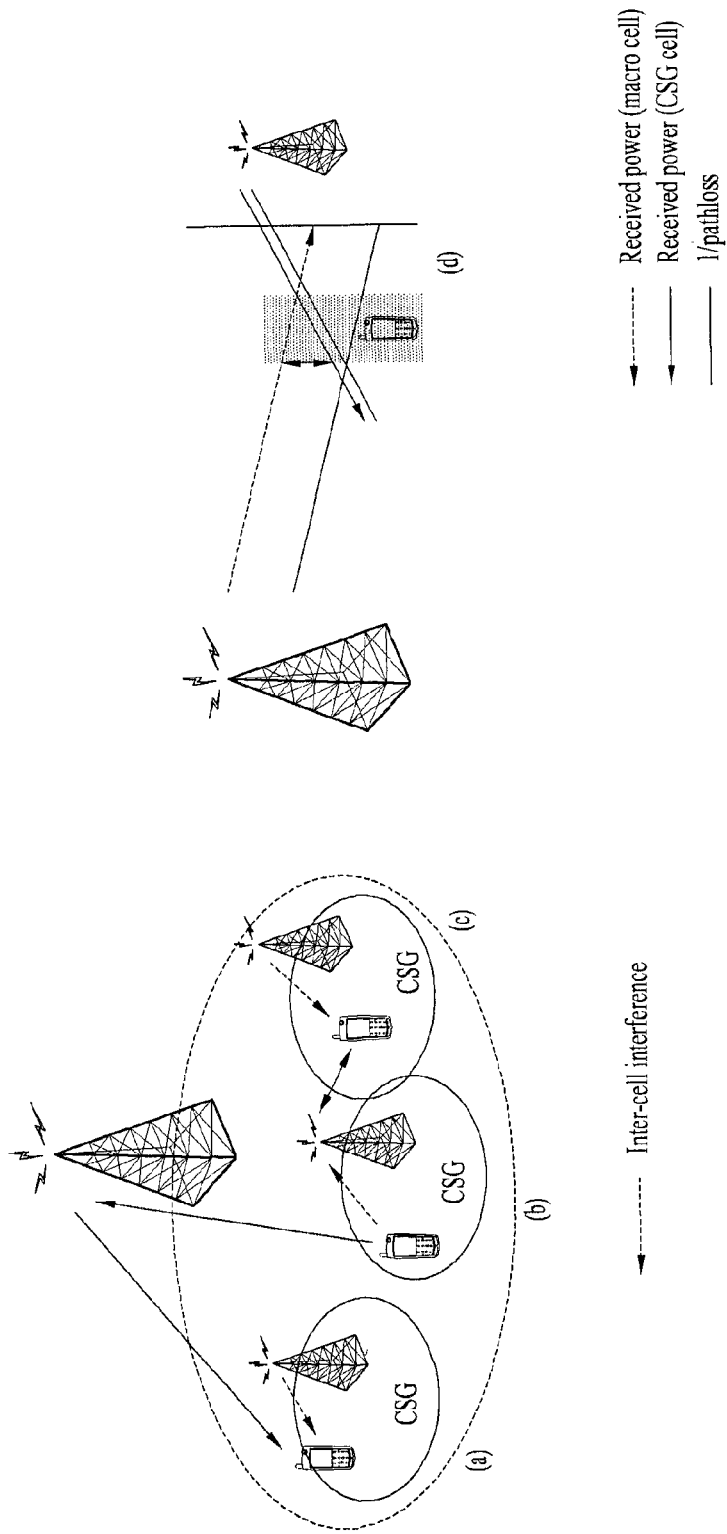
FIG. 13 is a diagram for one example of an interference possibly occurring in a heterogeneous network wireless communication system including a macrocell and a microcell.

FIG. 13 is a diagram for one example of an interference possibly occurring in a heterogeneous network wireless communication system including a macro cell and a microcell.

Referring to FIG. 13, a case (a) shows one example that a macro user equipment, for which an access to a CSG cell is not granted, experiences interference by an HeNB. A case (b) shows one example that a macro user equipment causes a severe interference toward the HeNB. A case (c) shows one example that a CSG user equipment experiences interference caused by another CSG cell. A case (d) shows one example that the increase of DL interference of a user equipment other than a macro user equipment on a cell boundary or edge is inevitable despite that an uplink may be improved owing to a path loss (e.g., a use of an inclining RSRP (reference signal received power) reporting) based on cell association.

This also implies that a method of handling an L1/L2 ($1^{st}$ layer/$2^{nd}$ layer) control signaling, a method of handling a synchronization signal and a method of handling a reference signal are important as well as UL/DL interference by which data is affected. These methods may work in time, frequency and/or space domain.

A macro-pico heterogeneous network or macro cell may cause a storing interference to a user equipment served by a pico cell, and more particularly, a user equipment located on an edge of a serving pico cell. A macro cell, which causes interference as a part of time-domain ICIC (inter-cell interference coordination), provides a subframe called an ABS (or ABSF: almost blank subframe) and can be protected against a strong interference attributed to a macro cell in a manner that any DL control channel or data channel is not transmitted in the ABSF except CRS. In case that PSS (Primary Synchronization Sequence), SSS (Secondary Synchronization Sequence), PBCH (Physical Broadcast Control Channel), SIB1 (System Information Block Type 1), Paging and PRS (Positioning Reference Signal match ABS, they are transmitted in the ABS. If ABS matches MBSFN (multicast broadcast single frequency network) subframe which does not transmit any signal in a data region, CRS is not transmitted in the data region of the ABS.

Figure 14:
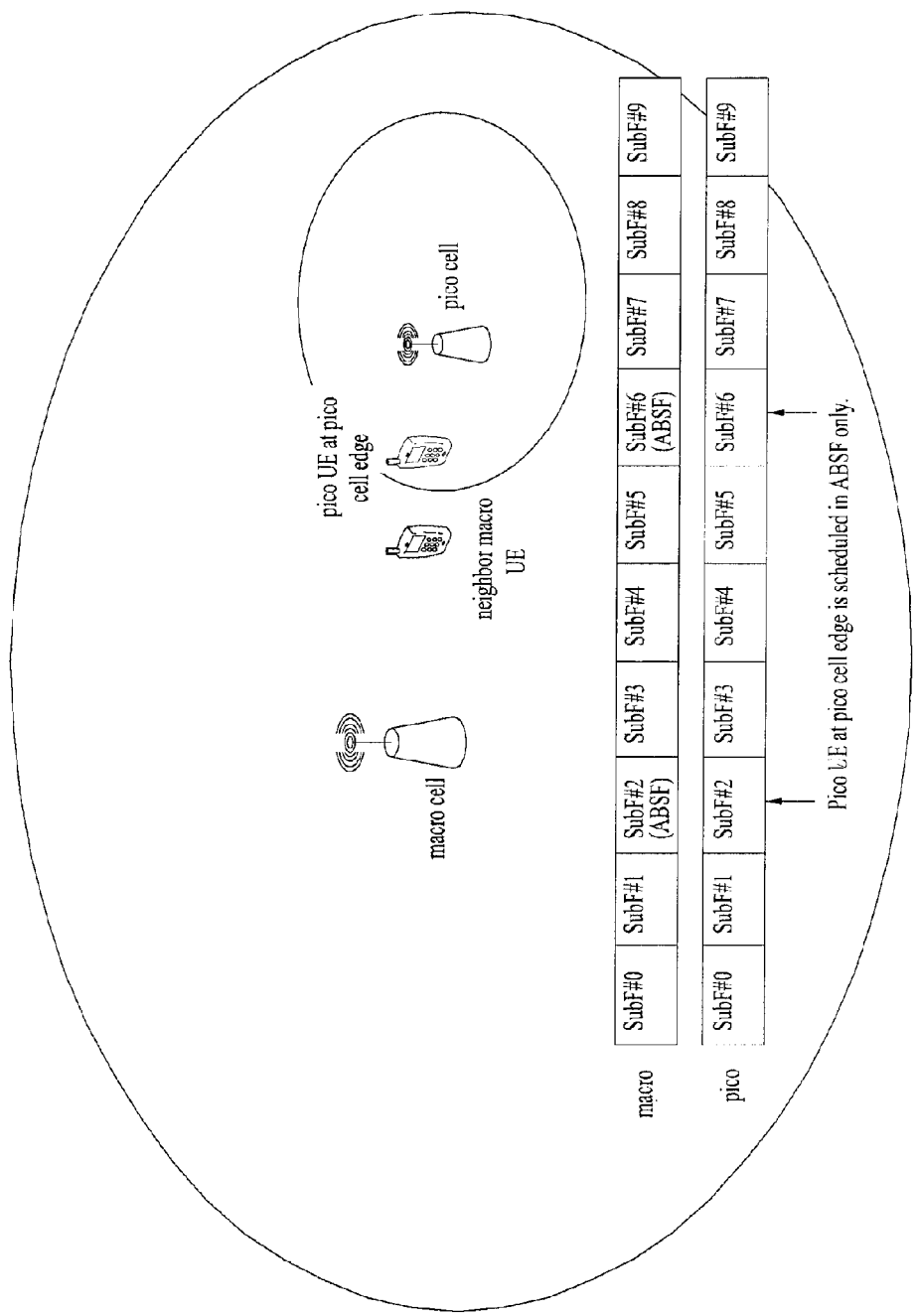
FIG. 14 is a diagram for one example of a configuration of ABS in a macrocell of a macro-pico network.

FIG. 14 is a diagram for one example of a configuration of ABS in a macro cell of a macro-pico network.

Referring to FIG. 14, a macro cell configures a subframe having an index #2 and a subframe having an index #6 with ABSF, and this information may be indicated to a pico cell via backhaul. The pico cell is able to schedule a pico user equipment (e.g., a user equipment served by the pico cell), and more particularly, user equipments on the boundary between the macro cell and the pico cell in ABSF only. In particular, the pico user equipment performs CSI measurement within ABSFs only.

A user equipment, which experiences interference, is configured to perform measurement for RLM/RRM (radio link monitoring/radio resource management) in subframe(s) restricted by a serving cell in order to accurately perform measurements of a received power (RSRP: reference signal received power), a reference signal received quality (RSRQ) and the like. To this end, a bitmap signaling (e.g., ABS is indicated by '1' and other subframes may be indicated by '0'.) having the same period of a backhaul signaling may be applicable but should have a pattern configured independent from a backhaul bitmap pattern.

Since it is insufficient for ICI technologies of the related art to overcome the co-channel interference, two kinds of scenarios (i.e., CSG scenario and pico scenario) have been proposed. These scenarios are examples of a network configuration to depict basic concept of time-domain ICIC and may be applicable to other network deployment scenarios.

Figure 15:
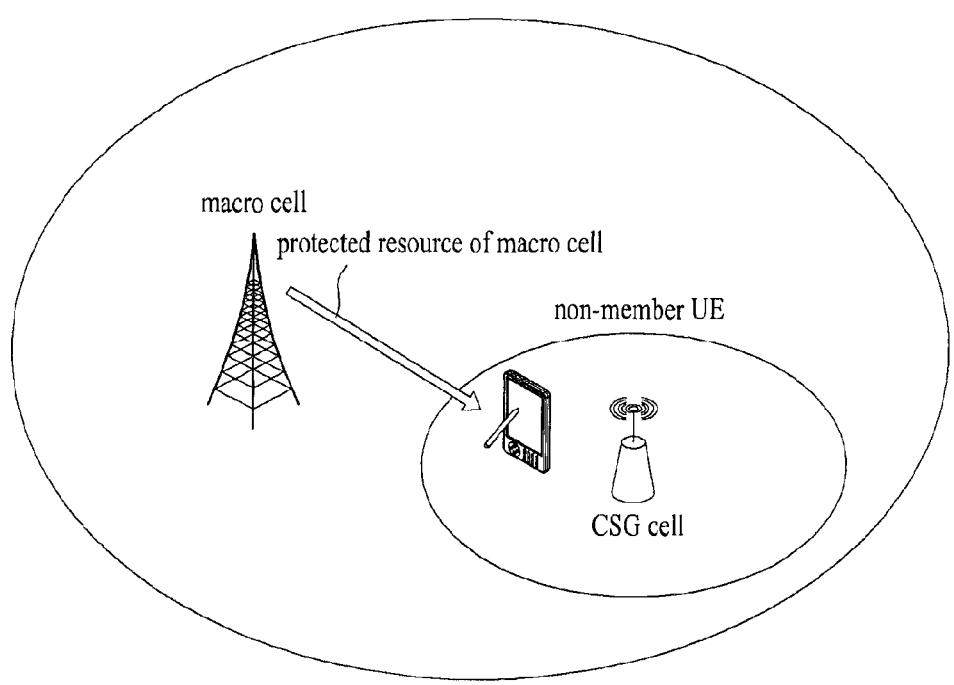
FIG. 15 is a diagram for one example of a CSG (closed subscriber group) scenario as a part of time-domain ICIC (inter-cell interference coordination)

FIG. 15 is a diagram for one example of a CSG (closed subscriber group) scenario as a part of time-domain ICIC (inter-cell interference coordination).

Referring to FIG. 15, if an access to a CSG cell is not granted to a user equipment, such a user equipment shall be named a non-member user equipment. When the non-member user equipment approaches close to a CSG cell, a major interference state may occur. Due to the network deployment and strategy, it may be impossible to divert a user equipment affected by an inter-cell interference to another E-UTRA (evolved-universal terrestrial radio access) carrier or another RAT (radio access technology) carrier. A time-domain ICIC may be usable to allow the non-member user equipment to receive a service from a macro cell on the same frequency layer.

Such interference may be reduced using ABSF in order for a CSG cell to protect a subframe of a corresponding macro cell from interference. The non-member user equipment may be signaled to use resources reserved for RRM for a serving cell, RLM and CSI measurements. And, the non-member user equipment may be allowed to keep receiving the service from the macro cell under the strong interference from the CSG cell.

In RRC-CONNECTED state, a network can observe that a non-member user equipment is related to a strong interference from a CSG cell via measurement events defined by LTE Release-8/9 for example. For this user equipment, the network may configure RRM/RLM/SCI measurement resource to be restricted. In order to facilitate mobility from a serving macro cell, the network may configure RRM measurement resource for a neighbor cell to be restricted. If the network detects that the user equipment does not receive the strong interference any more, it may be able to cancel the restriction put on the RRM/RLM/CSI measurement resource.

Figure 16:
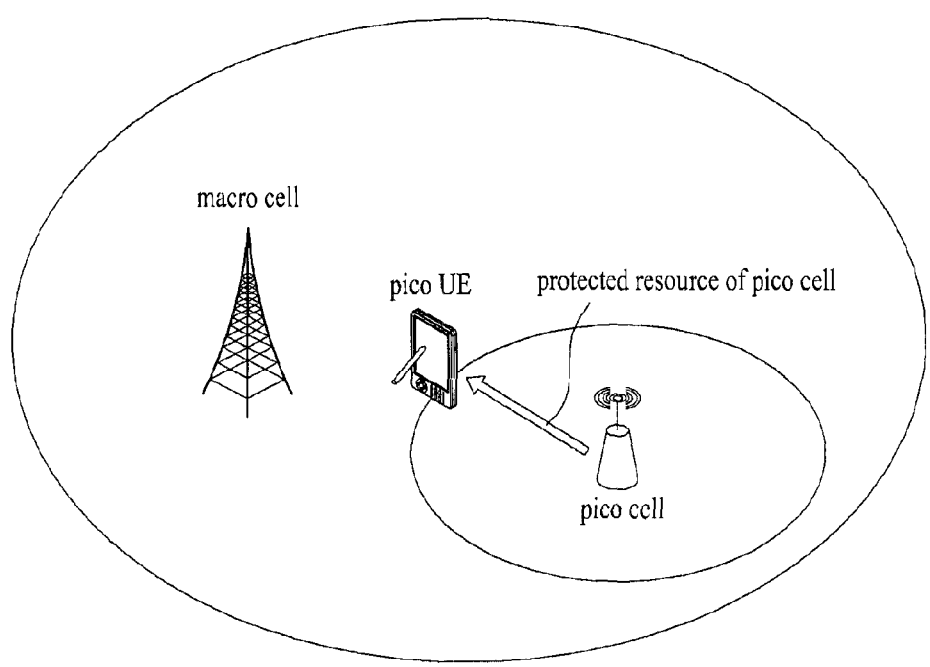
FIG. 16 is a diagram for one example of a pico scenario as a part of time-domain ICIC (inter-cell interference coordination)

FIG. 16 is a diagram for one example of a pico scenario as a part of time-domain ICIC (inter-cell interference coordination).

Referring to FIG. 16, a time-domain ICIC may be usable to a pico user equipment (e.g., a user equipment in the course of off-loading to a pico cell from a macro cell) located on an edge of a serving pico cell. The time-domain ICIC (inter-cell interference coordination) may be used to allow the above-user equipment to receive a service from the pico cell on the same frequency layer. This interference may be reduced in a manner that a macro cell uses ABSF to protect a subframe of a pico cell from the interference. The pico user equipment (e.g., a user equipment served by the pico cell) may be able to use the resources reserved for the cell measurement (RRM) for the serving pico cell, the RLM measurement and the CSI measurement. For the pico user equipment, the restriction put on the RRM/RLM/CSI measurement may enable more accurate measurement of the pico cell under the strong interference from the macro cell. The pico cell may be able to selectively configure the restriction of the RRM/RLM/CSI measurement resources only for the user equipments related to the strong interference from the macro cell. In order to facilitate the mobility to the pico cell from the macro cell for a user equipment serviced by the macro cell, the network may configure the restriction to be put on the RRM measurement resource for a neighbor cell.

In the following description, a method of delivering information on a subframe pattern (e.g., ABS pattern, etc.) between cells is explained in detail.

First of all, an interference-giving cell may be able to signal 2 bitmaps to an interference-receiving via X2 interface. Each of the bitmaps may be configured to have 40-bit size and may be able to represent the attribute of each subframe by a unit of 40 subframes. The $1^{st}$ bitmap indicates a subframe having ABS situated therein. In particular, the $1^{st}$ bitmap may correspond to a bitmap that represents the ABS and other subframes as 1 and 0, respectively. The $2^{nd}$ bitmap may correspond to a bitmap indicating a subframe supposed to be set to the ABS of the $1^{st}$ bitmap in high probability. In particular, the subframe, which should be set to the ABS in the $2^{nd}$ bitmap, may correspond to a subset of the subframe set to the ABS in the $1^{st}$ bitmap. Such a subset may be used by a receiving state for the configuration of the restricted RLM/RRM measurement. A serving cell indicates actual resources for the RLM/RRM and CSI through RRC signaling.

In order to indicate an ABS pattern from a macro cell to a pico cell, a bitmap pattern is used. A period of a bitmap pattern in FDD system may be 40 ms, a period of a bitmap pattern in TDD system may be 20 ms in case of UL-DL configurations 1 to 5, a period of a bitmap pattern in TDD system may be 70 ms in case of UL-DL configuration 0, and a period of a bitmap pattern in TDD system may be 60 ms in case of UL-DL configuration 6.

The above-described bitmap pattern may be semi-statically updated. In doing so, an update trigger may occur aperiodically. And, the update trigger may occur on the basis of an event.

3. 7. Scheduling Information Exchange between Base Stations

In LTE/LTE-A system, as mentioned in the foregoing description, in order to reduce the interference between base stations, ABS (almost blank subframe) is assigned for the interference reduction of a data channel (e.g., PDSCH) to enable an interference-receiving cell (i.e., a victim cell) to receive an interference-free signal.

Besides, using scheduling information between base stations, it may be able to orthogonally assign a frequency region having been assigned to each user equipment on a cell boundary.

Figure 17:
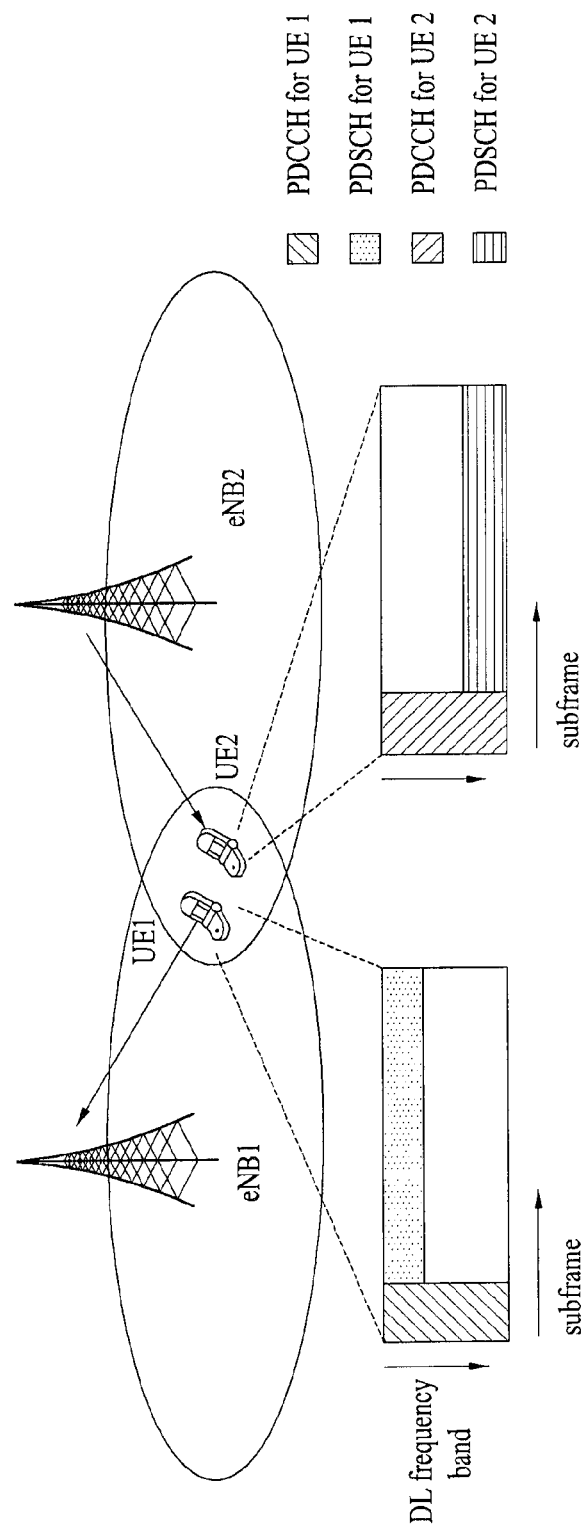
FIG. 17 is a diagram for one example of a scheme of reducing interference by exchanging scheduling information between base stations.

FIG. 17 is a diagram for one example of a scheme of reducing interference by exchanging scheduling information between base stations.

Referring to FIG. 17, a base station 1 (i.e., eNB 1) transmits PDCCH and PDSCH to a user equipment 1 (i.e., UE 1), while a base station 2 (i.e., eNB 2) transmits PDCCH and PDSCH to a user equipment 2 (i.e., UE 2). In doing so, in a manner of exchanging scheduling information between the base stations eNB 1 and the eNB 2, the base station eNB 1/eNB 2 may be able to reduce the interference by assigning PDSCH to an orthogonal frequency region for the corresponding user equipment UE1/UE2. Yet, since the PDCCH for the user equipment UE 1/UE 2 is transmitted on a full DL frequency band, the interference may not be reduced despite the scheme of exchanging the scheduling information between the base stations.

Moreover, interference may be generated if base stations differ from each other in UL/DL configuration.

Figure 18:
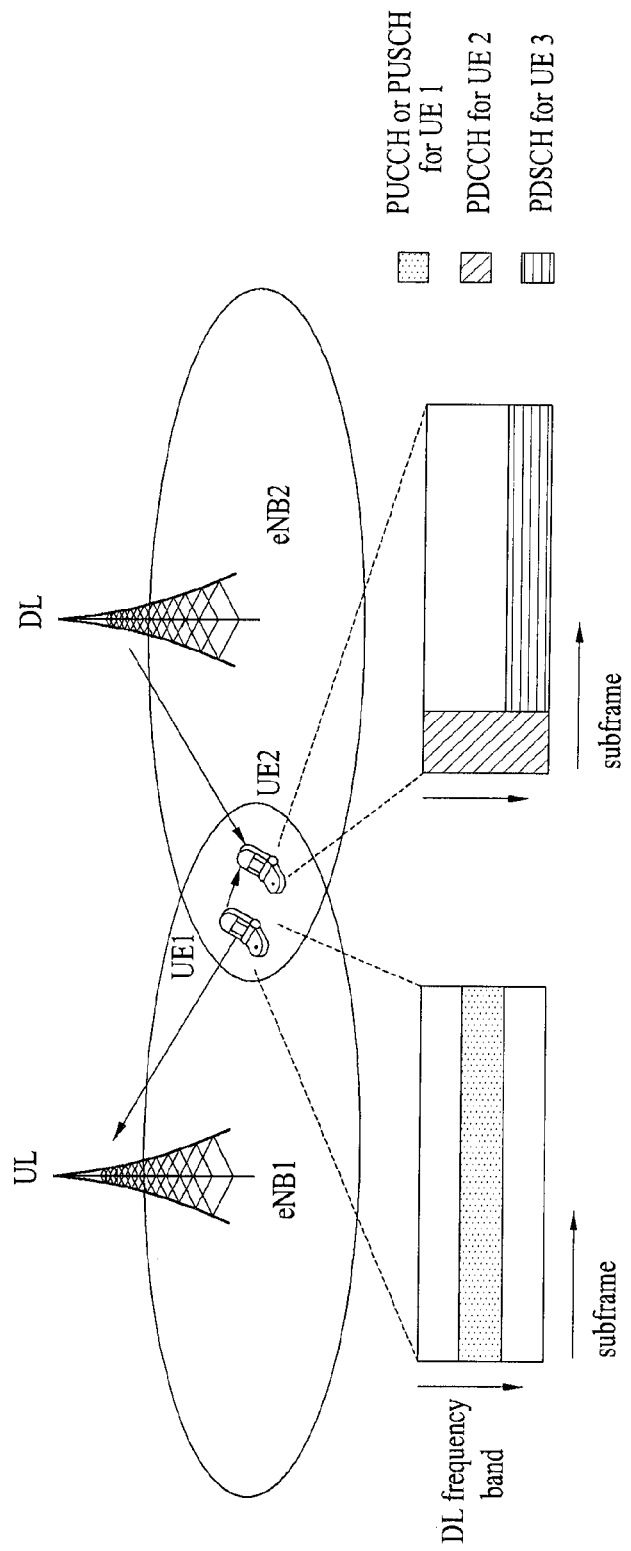
FIG. 18 is a diagram for one example of a scheme of reducing interference by exchanging scheduling information between base stations differing from each other in UL/DL configuration.

FIG. 18 is a diagram for one example of a scheme of reducing interference by exchanging scheduling information between base stations differing from each other in UL/DL configuration.

Referring to FIG. 18, a base station 1 eNB 1 receives PUCCH or PUSCH from a user equipment 1 UE 1, while a base station 2 eNB 2 transmits PDCCH or PDSCH to a user equipment 2 UE 2. In doing so, the PUCCH or PUSCH transmitted by the user equipment 1 UE 1 may work as interference with the PDCCH and PDSCH supposed to be received by the user equipment 2 UE 2 neighboring to the user equipment 1 UE 1. In this case, if scheduling information is exchanged between the base station 1 eNB 1 and the base station 2 eNB 2, the inference with the PDSCH transmitted to the user equipment 2 UE 2 may be reduced in a manner of assigning the user equipments UE 1 and UE 2 to frequency regions orthogonal to each other, respectively. In particular, the interference can be reduced in a manner that the PUCCH or PUSCH transmitted to the base station 1 eNB 1 by the user equipment 1 UE 1 and the PDSCH transmitted to the user equipment 2 by the base station 2 eNB 2 are assigned to frequency regions orthogonal to each other, respectively. Yet, as mentioned in the foregoing description, since the PDCCH transmitted to the user equipment 2 UE 2 is transmitted on the full DL frequency band, it may be affected by the interference attributed to the PUCCH or PUSCH transmitted by the user equipment 1 UE 1.

Thus, since a control channel (e.g., PDCCH, PCFICH, PHICH, etc.) can be transmitted in all subframes in a manner of being assigned to a full DL frequency bandwidth, it may be difficult to avoid interference. Therefore, the demand for a method of reducing or avoiding interference with a control channel rises.

In order to solve the above problem, the present invention proposes a cross subframe scheduling method and an indication method for the same.

3. 8. Example of ABS (Almost Blank Subframe)

Figure 19:
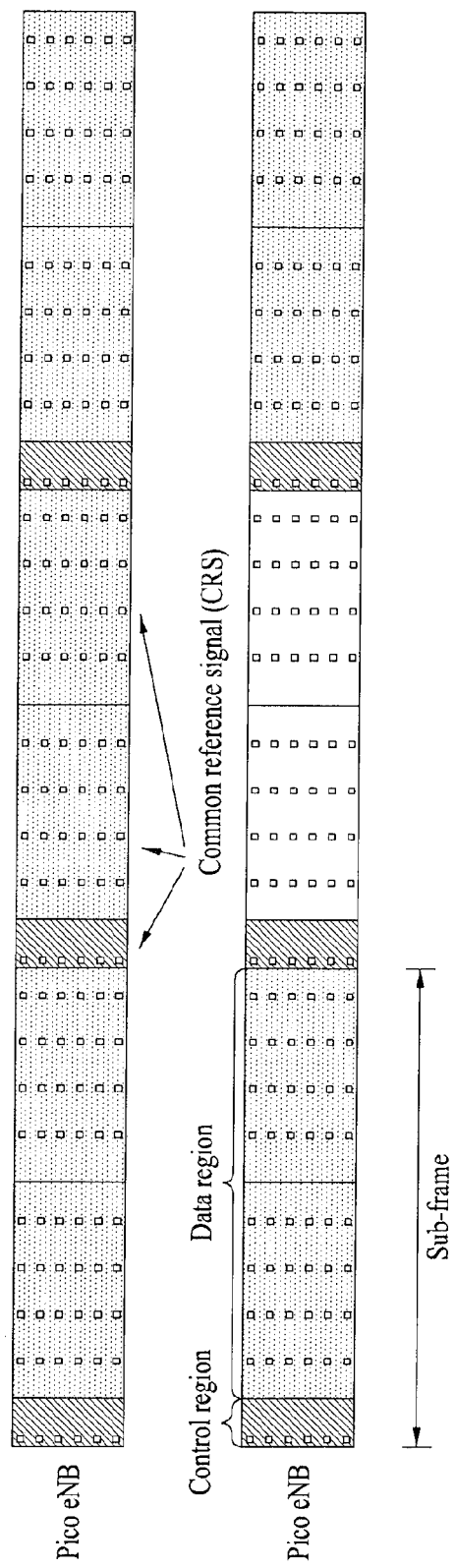
FIG. 19 is a diagram for one example of an almost blank subframe having FIG. 13 apply thereto.

FIG. 19 is a diagram for one example of an almost blank subframe having FIG. 13 applied thereto. In particular, FIG. 19 shows one example of DL environment mutual interference influence in a heterogeneous network structure.

Referring to FIG. 19, a macro user equipment located in an outer area of a pico base station receives serious interference from the pico base station. In this case, the corresponding macro user equipment performs a handover into the pico base station through CRE execution. Yet, the macro user equipment still receives the interference from a macro base station. And, a pico user equipment serviced by the pico base station receives the interference from the macro base station as well and may be unable to detect a desired signal. Consequently, a best way for the macro base station not to interfere with a radio resource used by an outer user of a pico base station is to empty a corresponding subframe. This concept enables the technique of ABS. In particular, referring to FIG. 19, the macro base station creates an interval for not transmitting data. Based on this information exchanged between the base stations, the pico base station schedules its outer user equipments in the corresponding subframe, thereby avoiding the corresponding interference.

FIG. 20 is a diagram for one example of two kinds of ABS types.

Referring to FIG. 20, in a normal subframe of ABS, CRS (common reference signal) can be still transmitted. Hence, the influence of the interference with the CRS still remains. On the other hand, since CRS is not transmitted in a data region of an MBSFN (multicast/broadcast over a single frequency network) subframe, it may be able to reduce the influence of the interference with the CRS. Yet, since a user of the MBSFN is restrictive, ABS pattern is created and used in consideration of properties of the MBSFN subframe. The corresponding technology is applicable to UL environment as it is.

4. Subframe Shift & Symbol Level Shift

Figure 21:
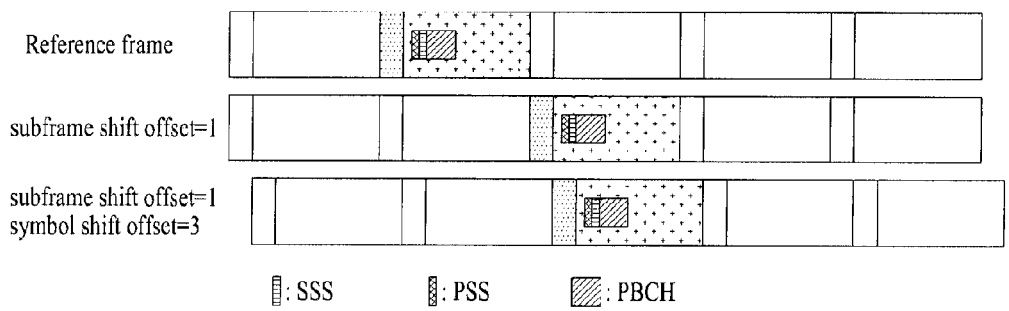
FIG. 21 is a diagram for examples of a subframe shift and a symbol level shift.

FIG. 21 is a diagram for examples of a subframe shift and a symbol level shift.

Referring to FIG. 21, in case of ABS used to avoid interference in a heterogeneous network, such a signal corresponding to a common channel as PSS, SSS, PBCH, Paging, SIB1 and the like can be transmitted in a corresponding ABS. Hence, under the circumstances of the heterogeneous network, the corresponding signals interfere with each other to disable an access of a user equipment. The above drawing shows a subframe shift for avoiding mutual interference between PSS, SSS and PBCH and a symbol level shift for reducing interference on a control region. Considering the example shown in the drawing, since positions of the PSS, SSS and PBCH are misaligned with each other in a time domain, it may be able to reduce interference in a manner of configuring the corresponding subframe ABS mutually or muting the corresponding resources mutually.

Yet, since mutual control regions overlap with each other despite the subframe shift, the interference with the control channel still remains serious.

In FIG. 21, if a symbol level shift is performed after completion of the subframe shift (on the assumption that a control region includes 3 OFDM symbols), since a previous control region overlaps with a data region of another subframe, a corresponding subframe is set to ABS or the corresponding 3 OFDM symbols are muted, whereby the interference with the control region can be reduced.

FIG. 20 shows a frame structure for reducing interference, as mentioned in the foregoing description, in a manner of configuring a 2-subframe shift for interference reduction of common channels, configuring a 3-OFDM symbol shift for protection of a control region, and setting a normal subframe and MBSFN subframe of a base station, which corresponds to an aggressor to ABS for the corresponding interference reduction.

Figure 22:
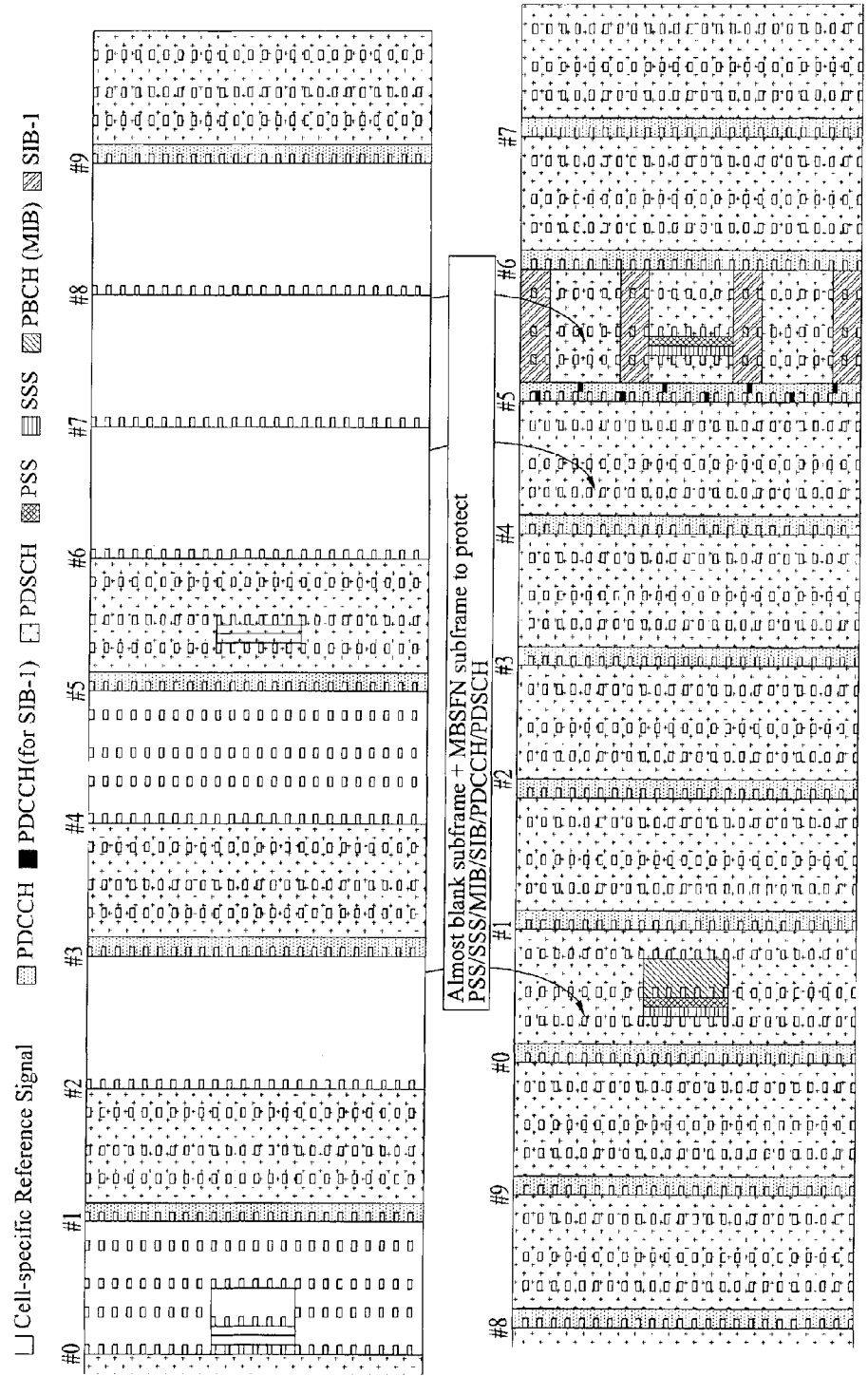
FIG. 22 is a diagram for examples of an ABS and subframe shift and a symbol level shift.

FIG. 22 is a diagram for examples of an ABS and subframe shift and a symbol level shift.

Referring to FIG. 22, even if ABS and subframe shift technique and OFDM symbol shift technique are performed for interference reduction, it may be difficult to completely avoid CRS interference from an adjacent neighbor cell. Since an MBSFN subframe is advantageous in not transmitting CRS in a data region, if the MBSFN subframe is set to ABS, it may reduce the influence of the interference from the CRS but restriction is put on using the MBSFN subframe. In case of FDD, it is impossible to perform the MBSFN subframe configuration on a subframe for transmitting PBCH, PSS, SSS, paging or SIB1. Hence, in FDD, it is impossible to perform the configuration on subframes #0, #4, #5 and #9.

Due to the same reason, in TDD, it is impossible to perform the configuration on subframes #0, #1, #5 and #6. Moreover, in case that an aggressor base station sets all available MBSFN subframes to ABS, it may cause a problem that system throughput is lowered due to the loss of its radio resources. Due to these reasons, some restrictions are put on using MBSFN. Moreover, if MBSFN is configured for a different usage, it may be unable to perform the ABS configuration.

Especially, in case of TDD, when a subframe shift is applied, as DL/UL subframes overlap with each other between cells adjacent to each other, a transmitted signal of the UL subframe interferes with a user of the DL subframe of the adjacent cell. In case of a DL user in the vicinity of a UL user, a serious interference problem is caused.

In a wireless network based wireless communication system, interference between homogeneous base stations (or homogeneous networks) or interference between heterogeneous base stations (or heterogeneous networks) exists. The influence of this interference may affect a control channel as well as a data channel. In LTE/LTE-A system, ABS (almost blank subframe) is assigned for interference reduction of a data channel (PDSCH). Hence, a victim cell is able to receive an interference-free signal. And, a frequency region assigned to each user equipment located in an outer cell can be orthogonally assigned using scheduling information between base stations. Yet, a control channel (e.g., PDCCH, PCFICH, PHICH, etc.) can be transmitted in every subframe and is transmitted in a manner of being assigned to a full DL bandwidth. Hence, it may be difficult to avoid interference. And, the demand for a technique for reducing or avoiding interference with a control channel is rising.

FIG. 17 shows a scheme of reducing interference by assigning PDSCH to an orthogonal region for user equipments located in an outer cell, which is a scheme available for exchanging scheduling information between base stations. Yet, as mentioned in the foregoing description, since PDCCH is transmitted on a full DL bandwidth, it may cause a problem that interference is not reduced.

In case that base stations differ from each other in UL/DL configuration, interference is generated. In particular, referring to FIG. 18, the PUCCH or PUSCH transmitted by the UE 1 may work as interference with PDCCH/PDSCH supposed to be received by the adjacent UE 2. In doing so, if scheduling information is exchanged between the base stations, the interference with the PDSCH may be avoided in a manner that user equipments are assigned to frequency regions orthogonal to each other. Yet, the PDCCH transmitted on the full DL bandwidth experiences the interference with the PUCCH or PUSCH transmitted by the UE 1.

In order to reduce the influence of the interference, the introduction of ePDCCH (enhanced PDCCH, new PDCCH, or advanced PDCCH) different from a current PDCCH is currently discussed. This ePDCCH may be used for an introduction of a new technology as well as interference. For instance, such ePDCCH may be introduced to support CoMP (coordinated multipoint transmission) effectively.

Yet, despite the introduction of the ePDCCH, it may be unable to avoid the interference with PHICH carrying ACK/NACK information on PUSCH. This interference causes a problem of retransmission of PUSCH, thereby lowering throughput performance of a whole system. Moreover, since PHICH is carried on a control channel region previously determined to use maximum 3 symbols, a size of a resource for carrying PDCCH is dependent on a used PHICH resource size. If a PHICH carried resource size increases, a PDCCH capacity decreases, thereby causing a problem that PDCCH blocking possibility increases.

When ePDCCH and ePHICH are introduced to reduce influence of interference with PDCCH and PHICH and solve a problem caused by the shortage of capacity of PDCCH region, the present invention relates to a method of operating the introduced ePDCCH and ePHICH and a method of indicating the same. The ePDCCH may be configured not to overlap with a previous PDCCH region, of which examples are shown in the diagrams 3 to 7. The ePDCCH may be configured after OFDMA symbol that configures a previous PDCCH. In doing so, OFDMA symbols configuring the PDCCH and OFDMA symbols configuring ePDCCH may be configured contiguous with each other. Irrespective of this configuration, the number of start OFDMA symbols of the ePDCCH may be indicated by a separate signaling (e.g., an RRC signaling, PDCCH signaling, etc.). In this case, at least one OFDMA symbol may exist between a PDCCH region and an ePDCCH region in time domain. For clarity, in the following examples, assume that a PDCCH region and an ePDCCH region are contiguous with each other in time domain.

5. Configuration of ePDCCH and Indicating Method thereof According to the Present Invention 5. 1. Configuration of ePDCCH FIG. 23A is a diagram for one example of a configuration of ePDCCH in time domain.

Figure 23A:
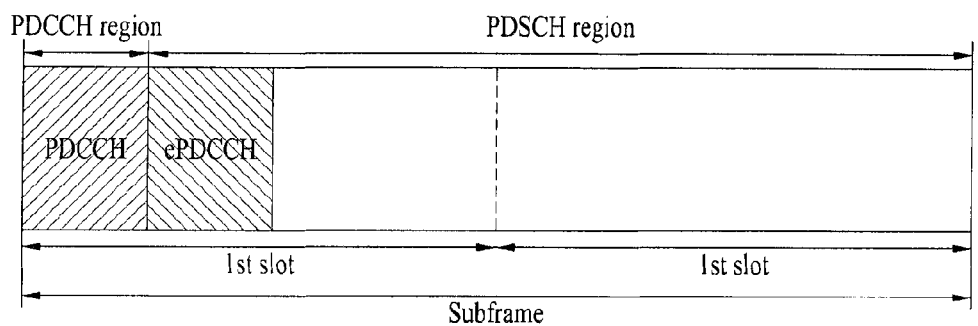
FIG. 23A is a diagram for one example of a configuration of ePDCCH in time domain.

Referring to FIG. 23A, OFDMA symbols, of which number is indicated by PCFICH, situated in a front part of a subframe are used as previous PDCCH. Subsequently, contiguous OFDMS symbol(s), of which number is indicated by RRC or PDCCH, is used as ePDCCH.

Figure 23B:
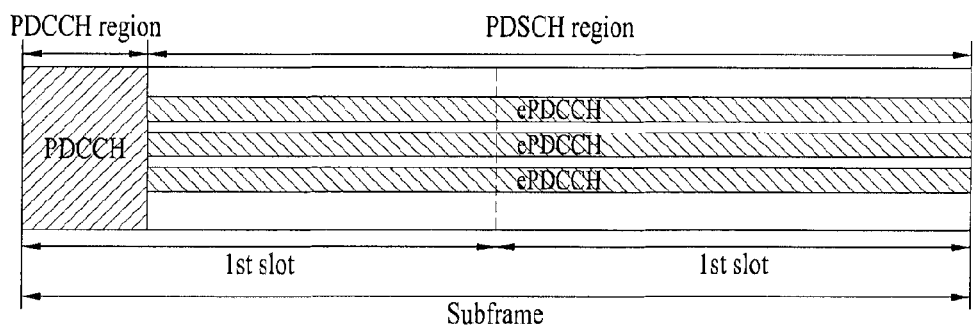
FIG. 23B is a diagram for another example of a configuration of ePDCCH in time domain.

FIG. 23B is a diagram for another example of a configuration of ePDCCH in time domain.

Referring to FIG. 23B, OFDMA symbols, of which number is indicated by PCFICH, situated in a front part of a subframe are used as previous PDCCH. Subsequently, the rest of OFDMS symbol(s) in the subframe is used as ePDCCH. In this case, a frequency region of the ePDCCH may be indicated by RRC or PDCCH.

Figure 23C:
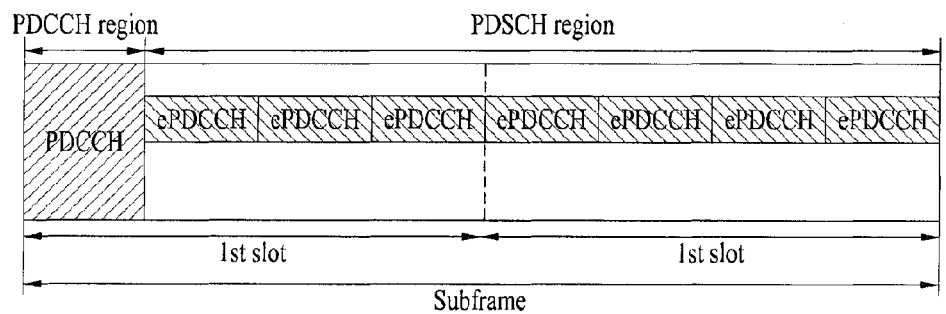
FIG. 23C is a diagram for another example of a configuration of TDM type ePDCCH occupying a subframe.

FIG. 23C is a diagram for another example of a configuration of TDM type ePDCCH occupying a subframe.

Referring to FIG. 23C, OFDMA symbols, of which number is indicated by PCFICH, situated in a front part of a subframe are used as previous PDCCH. Subsequently, the rest of OFDMS symbols in the subframe are used as ePDCCHs. The ePDCCHs for user equipments may be multiplexed by TDM, as shown in the drawing of the corresponding example. In this case, a frequency region of the ePDCCH may be indicated by RRC or PDCCH.

Figure 23D:
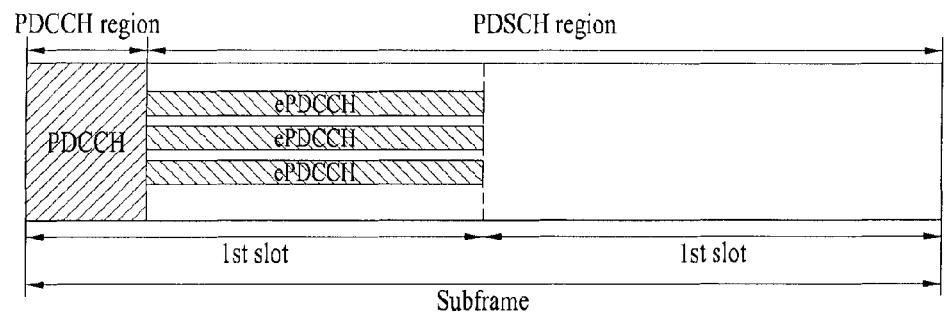
FIG. 23D is a diagram for one example of a configuration of ePDCCH occupying a $1^{st}$ slot.

FIG. 23D is a diagram for one example of a configuration of ePDCCH occupying a 1$^{st}$ slot.

Referring to FIG. 23D, OFDMA symbols, of which number is indicated by PCFICH, situated in a front part of a subframe are used as previous PDCCH. Subsequently, the rest of OFDMS symbol(s) in a 1$^{st}$ slot of the subframe is used as ePDCCH. In this case, a frequency region of the ePDCCH may be indicated by RRC or PDCCH.

Figure 23E:
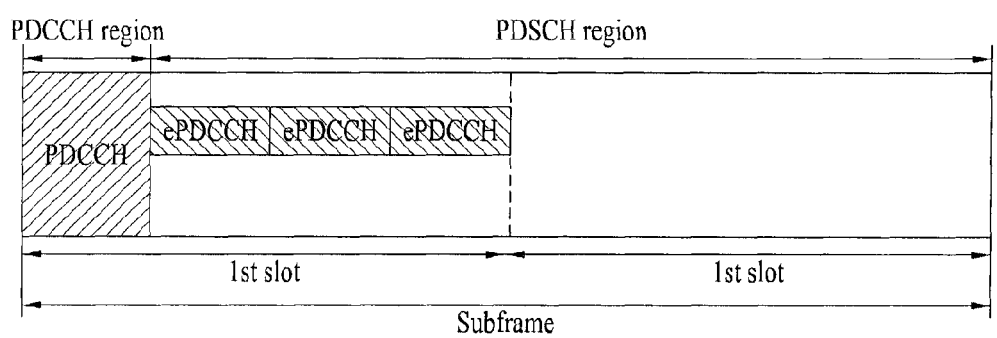
FIG. 23E is a diagram for another example of a configuration of ePDCCH occupying a $1^{st}$ slot.

FIG. 23E is a diagram for another example of a configuration of ePDCCH occupying a 1$^{st}$ slot.

Referring to FIG. 23E, OFDMA symbols, of which number is indicated by PCFICH, situated in a front part of a subframe are used as previous PDCCH. Subsequently, the rest of OFDMS symbol(s) in a 1$^{st}$ slot of the subframe is used as ePDCCH. The ePDCCHs for user equipments may be multiplexed by TDM, as shown in the drawing of the corresponding example. In this case, a frequency region of the ePDCCH may be indicated by RRC or PDCCH.

5. 2. ePDCCH Indicating Method

Various kinds of methods for indicating a time or frequency region of ePDCCH shown in one of FIGS. 23A to 23E are available.

(1) A user equipment is able to know a time or frequency region of ePDCCH by an RRC signaling (or configuration).

(2) A user equipment is able to know a time or frequency region of ePDCCH through a specific format or field of PDCCH previously determined by an RRC signaling (or configuration).

In case that a base station indicates a frequency region used by ePDCCH, 3 kinds of methods are available as follows.

(1) PRV (or VRB) indexes used by ePDCCH among full PRBs (physical resource blocks) (or full VRBs (virtual resource blocks) are indicated.

(2) Lowest PRB index used by ePDCCH among full PRBs (or VRBs) is indicated. A user equipment is able to know a position of PRB (or VRB) used for ePDCCH by a predetermined rule (e.g., contiguous VRB, etc.). In doing so, a base station may also indicate information on how many PRBs (or VRBs) will be used.

(3) PRB (or VRB) used as a bitmap for full PRBs (or VRBs) by ePDCCH is indicated. For instance, using bits for full PRBs (or VRBs), each bit is able to indicate whether to use ePDCCH of each PRB (or VRB) in a manner of being set to 0 (e.g., not use) or 1 (e.g., use).

Meanwhile, ePDCCH may be configured by various ways as well as the former methods mentioned in the foregoing description. And, a detailed ePDCCH configuring method is non-limited by the application of the present invention.

Unlike PDCCH and PHISCH carried on the determined OFDMA symbol in a front part of a subframe in the legacy LTE Release-10 system, the present invention is applicable to a case of transmitting both ePDCCH and ePHICH on PDSCH region of the legacy Release-10 system.

6. ePDCCH Operating Method in Heterogeneous Cell According to the Present Invention 6. 1. Method of Operating ePDCCH between Macro Cells When ePDCCH is assigned to a data region by one of various methods in order to reduce PDCCH interference between macros and increase use capacity, control channel scheduling information or control channel candidate scheduling information can be exchanged via an X2 interface between macros for the protection from interference with the assigned data region. In doing so, the X2 interface may be replaced by an S1 interface. Since user equipments experiencing the inter-macro interference include the user equipments located in mutual outer areas, a frequency-domain bitmap, which contains control information in a data region, of RB unit or a time-domain bitmap of a slot or subframe unit can be created and exchanged in-between to protect ePDCCH information of the corresponding victim user equipments. The above exchanging process may be performed in a manner of receiving E-PDCCH (enhanced-physical downlink control channel) including DL scheduling information in a data region from a neighbor base station and then assigning E-PDCCH including DL scheduling information of a serving base station to the data region based on the DL scheduling information received form the neighbor base station. Moreover, it may be able to share the scheduling information in a manner of transmitting the DL scheduling information of the serving base station to the neighbor base station.

The ePDCCH is assigned in a manner of being orthogonal to a mutual resource by referring to the exchanged information and the corresponding resource is mutually muted or a user equipment (e.g., a user equipment located in an inner cell) of transmitting low-power data is scheduled. Thus, mutual interference can be reduced. If the two kinds of the bitmaps (e.g., RB-unit bitmap and slot-unit bitmap) or 2-dimensional bitmaps including both of the RB unit and the slot unit are created and exchanged, more accurate resource allocation information of ePDCCH can be transmitted and may be optimized for the resource mapping scheme of the ePDCCH. And, this scheme is extensibly applicable to ePHICH.

6. 2. ePDCCH Operation between Macro Cell and Pico Cell (Non-CSG)

When ePDCCH is assigned to a data region by one of various methods in order to reduce PDCCH interference between macro and pico and increase use capacity, control channel scheduling information or control channel candidate scheduling information can be exchanged via an X2 interface between macro and pico for the protection from interference with the assigned data region. The above exchanging process may be performed in a manner of receiving E-PDCCH (enhanced-physical downlink control channel) including DL scheduling information in a data region from a neighbor base station and then assigning E-PDCCH including DL scheduling information of a serving base station to the data region based on the DL scheduling information received form the neighbor base station. Moreover, it may be able to share the scheduling information in a manner of transmitting the DL scheduling information of the serving base station to the neighbor base station. In doing so, the X2 interface may be replaced by an S1 interface. Although a major victim between a macro base station and a pico base station is a pico user equipment located in an outer pico cell, a macro user equipment located in an inner pico cell is a victim user equipment (UE) as well and receives interference. When CRE is performed, since the macro user equipment located in the inner pico cell gets closer to the pico cell, the macro user equipment located in the outer pico cell may become a victim user equipment. A frequency-domain bitmap, which contains control information in a data region, of RB unit or a time-domain bitmap of a slot or subframe unit can be created and exchanged in-between to protect ePDCCH information of the corresponding victim user equipments. The ePDCCH is assigned in a manner of being orthogonal to a mutual resource by referring to the exchanged information and the corresponding resource is mutually muted or a user equipment (e.g., a user equipment located in an inner cell) of transmitting low-power data is scheduled. Thus, mutual interference can be reduced. If the two kinds of the bitmaps (e.g., RB-unit bitmap and slot-unit bitmap) are created and exchanged, more accurate resource allocation information of ePDCCH can be transmitted and may be optimized for the resource mapping scheme of the ePDCCH. And, this intact scheme is applicable to ePHICH.

6. 3. ePDCCH Operation between Macro Cell and Femto Cell (CSG)

When ePDCCH is assigned to a data region by one of various methods in order to reduce PDCCH interference between macro and femto and increase use capacity, since it is impossible to exchange scheduling information via an X2 interface between macro and femto for the protection from interference with the assigned data region, a semi-static ePDCCH transmission resource allocation for the ePDCCH protection is required. In macro-femto case, a major victim user equipment may include a macro user equipment in the vicinity of a femto cell. For ABS operation in the femto cell, it may be able to use a semi-static ABS pattern. In particular, a serving base station receives and acquires ABRB (almost blank RB) pattern information in accordance with the ABS operation in the semi-static femto cell via RRC. Therefore, it may be able to reduce interference by performing resource allocation in a manner of linking a corresponding ePDCCH with eICIC (enhanced inter-cell interference coordination) in a corresponding time domain to fit the above pattern. Moreover, a semi-static ABRB (almost blank RB) and the like in a frequency domain for the ePDCCH is configured in a manner of defining a femto pattern of RB unit and may be then used to allocates an ePDCCH resource of a corresponding victim user equipment to a corresponding blank resource. In case that ABS in time domain for PDSCH and ABRB in frequency domain coexist, it may be able to apply a previously defined priority. For instance, ABRB is followed in the first place in a manner of giving a priority for a control channel and ABS is then followed. If high-priority data are necessary via PDSCHs, it may be able to optimize priority assignment of ABS, ABRB and the like using information on the corresponding priorities. If such an interface as X2, S1 and the like is available between a macro base station and a femto base station, it may apply the macro-macro base station scheme or the macro-pico base station scheme, which is mentioned in the foregoing description, thereto. And, the above-described scheme is extensibly applicable to ePHICH.

6. 4. Example of Bitmap Creation for ePDCCH Operation and Indication (Non-CSG Case)

Figure 24:
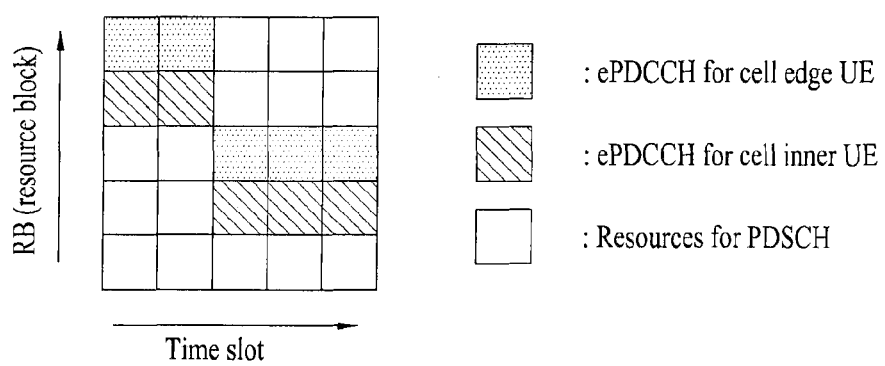
FIG. 24 is a diagram for one example of a resource model assigned for ePDCCH indication of the present invention.

FIG. 24 is a diagram for one example of a resource model assigned for ePDCCH indication of the present invention.

In case that resources are allocated in the manner represented by the example shown in FIG. 24, since ePDCCH is assigned to 5 time slots, scheduling information of an ePDCCH assigned time slot unit may be transmitted as a bitmap of a type '11111'. And, scheduling information of an RB unit in frequency domain may be transmitted as a bitmap of a type '01111'. If information on ePDCCH corresponding to a victim user equipment is shared only, each of the bitmaps may be transmitted as '11111' or '00101'. In case that an ePDCCH in an inner region has significance as well, a bitmap in time/frequency domain may be transmitted as 'HHHHH' or 'LMHMH'. In this case, 'H' means a high priority, 'M' means a medium priority, and 'L' means a low priority. Regarding those bitmaps, various types of the bitmaps may be transmitted to be suitable for the resource mapping schemes of ePDCCH or various combinations of the bitmaps may be transmitted.

In accordance with one of the various bitmap cases, when ePDCCH information on an outer cell user or a victim user equipment is transmitted only, a measurement value of the corresponding user equipment is used to determine a bit (e.g., 1, 0, etc.) or a state (e.g., H, M, L, etc.). In particular, the bit determination may operate in accordance with the following criteria.

A measurement value of a user equipment 1 is RSRQ1, a measurement value of a user equipment 2 is RSRP2, and γ is a specific threshold value for relative comparison.

$$RSRQ_1 \le \gamma \to 1 \text{ and } RSRQ_1 > \gamma \to 0 \qquad (1)$$

$$RSRP_1 \le RSRP_2 + \gamma \to 1 \text{ and } RSRP_1 > RSRP_2 + \gamma \to 0 \qquad (2)$$

$$\frac{RSRP_1}{RSRP_2} \le \gamma \to 1 \text{ and } \frac{RSRP_1}{RSRP_2} > \gamma \to 0 \qquad (3)$$

In addition to the above-mentioned three kinds of criteria, only if influence of interference is considerable, feedback information of the user equipment measurement may be determined by comparing scheduling information with reference to a specific threshold value γ. Moreover, the determination can be made by relative comparison of measurement values. The above technique is extensibly applicable to ePHICH. Besides, the bitmap indication method of the RB unit defined in the previous RNTP may be confirmedly applied in association with the above criteria and the like or may be utilized for ePDCCH.

In the following description, explained as the examples of an ePDCCH operating method including an indication via a bitmap for mutual interference reduction in a multi-cell environment with reference to the ePDCCH configurations shown in FIGS. 23A to 23E.

In case that ePDCCH is assigned to continuous OFDM symbol after a previous PDCCH control assignment region in a subframe, as shown in FIG. 23A, it may be able to operate ePDCCH through the following indication.

First of all, in aspect of one subframe, it may be able to indicate an index of a last one of contiguous symbols assigned for ePDCCH using a bitmap. In FIG. 23A, if ePDCCH is configured with OFDM symbols contiguous in a $2^{nd}$ slot despite being assigned in a $1^{st}$ slot, it may be able to perform an indication of a slot through a $1^{st}$ bit of a bitmap for the indication. The $1^{st}$ bit and the like are reserved for the corresponding bit configuration via the slot indication. Subsequently, it may be able to determine the number of bits fixed for an ePDCCH indication in one subframe by fixing the bits to N bits for an OFDM symbol index indication.

In case that a bitmap of a subframe unit is configured in the above manner, a bit stream of bitmaps by a plurality of subframe or radio frame units may be configured and sent as a single bit map to fit an actually signaling transmitted period.

In case that information on ePDCCH operation is exchanged in a manner of applying the above scheme by a single radio frame unit, a single bitmap is configured with '(1+N)*10' bits. In this case, '1' means a slot indication, 'N' means the number of bits for a symbol index indication, and '10' is the number of subframes in a single radio frame.

If there are many subframes having ePDCCH not assigned thereto, it may be able to indicate that there is no ePDCCH in the corresponding subframe in a manner of setting indication bits for the corresponding subframe to all zeros, padding a specific pattern with several bits to reduce a bitmap size, or inputting specific symbols values.

In case that ePDCCH is configured in a manner of assigning ePDCCH to a whole subframe region and indicating scheduling information on a frequency region by RRC or PDCCH, as shown in FIG. 23B, the following operating scheme is applicable.

First of all, if ePDCCH is configured by RB unit in frequency region, a bit stream is configured in a manner of indicating a presence or non-presence of ePDCCH assignment by the RB unit in a corresponding subframe using 0 or 1. A bitstream for contiguous subframes is configured into a single bitmap to fit a signaling period for sending the corresponding bitmap and the configured bitmap can be created/exchanged.

If there are no ePDCCH assignment in the corresponding subframe, it may be able to indicate that there is no ePDCCH in the corresponding subframe in a manner of setting indication bits for the corresponding subframe to all zeros, padding a specific pattern with several bits to reduce a bitmap size, or inputting specific symbols values.

In case that a system bandwidth is considerably wide, the RB-unit bitmap creation may result in a signaling overhead. Hence, several RB related patterns including odd/even number and the like for the RB indication of ePDCCH and a bit or symbol indicating a pattern used in a subframe may be created and exchanged as a bitmap format.

Bitmap creation in frequency domain may be performed by a carrier unit as well as by an RB unit to have the above-mentioned techniques or schemes applied thereto extensively. Hence, a frequency resource for ePDCCH may be generated by a unit of a single carrier or a unit of a plurality of carriers, a carrier subset of a frequency domain for one ePDCCH indication may be defined by a predetermined pattern, and such information as the number of carriers used as a single carrier subset and the like may be contained at a fixed position in a bitmap.

In case that TDM ePDCCH shown in FIG. 23C is configured, a bitmap for ePDCCH indication may be created and exchanged in a following manner.

First of all, since ePDCCH is assigned to one RB in one subframe or a frequency region by TDM, scheduling information on the corresponding frequency region, i.e., position information on PRB or carrier is reserved at a fixed position in a bitmap and a bitmap can be created by OFDM symbol unit. If a period of a single bitmap amounts to a radio frame unit, since the creation of the bitmap of the OFDM symbol unit may increase overhead, it may be possible to transmit the bitmap by reducing a bitmap size in a manner of configuring one ePDCCH with the fixed OFDM symbol number of aggregation level in each subframe or indicating the limited OFDM symbol number (or aggregation level).

In case that ePDCCH is configured in a $1^{st}$ slot by FDM, as shown in FIG. 23D, the scheme depicted in the drawing 4 is extensibly applicable. Moreover, in order to create information, which indicates whether ePDCCH is assigned to a $1^{st}$ slot of a corresponding subframe, into a bitmap only, a bitmap creation/exchange by a $1^{st}$ slot unit of each frame is possible as well.

In case that ePDCCH is configured in a $1^{st}$ slot by TDM, as shown in FIG. 23E, the scheme shown in FIG. 23C is extensibly applicable. Moreover, in order to create information, which indicates whether ePDCCH is assigned to a $1^{st}$ slot of a corresponding subframe, into a bitmap only, a bitmap creation/exchange by a $1^{st}$ slot unit of each frame is possible as well.

The above-described inventions may differently apply to ABS subframe or non-ABS subframe. The above-described inventions are extensibly applicable to a non-ABS system. In case of an ABS configuration system, the above-described inventions may be applicable in the following manners.

(1) Case that an Entity for ePDCCH Indication is a Victim Side that Receives Interference After information on ABS pattern has been already exchanged, if a subframe is set to ABS, it is unnecessary to indicate ePDCCH assignment information of its own. Hence, a related bitmap needs not to be created in the ABS. Since a counter cell is already aware that the corresponding subframe is the ABS, indication bit informations in the ABS may be excluded from a bitmap.

(2) Case that an Entity for ePDCCH Indication is a Victim Side that Gives Interference If ePDCCH assignment is possible in ABS, the above-described inventions are extensibly applicable. If ePDCCH assignment is impossible, it is unnecessary to create a related bitmap in the ABS. Since a counter cell is already aware that the corresponding subframe is the ABS, indication bit informations in the ABS may be excluded from a bitmap.

The ABS and non-ABS related operations are applicable to ePHICH. Indication schemes of the same concept of the examples of the detailed configurations for the ePDCCH are extensibly applicable in accordance with ePHICH configuration schemes.

6. 6. Example of Semi-static Pattern Operation for ePDCCH Operation and Indication (CSG Case)

Figure 25:
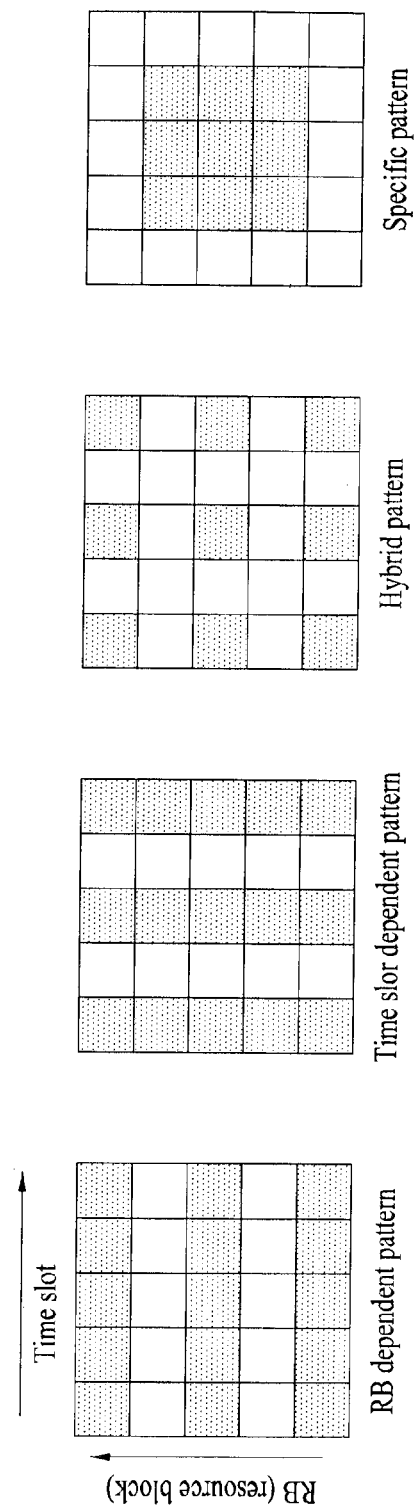
FIG. 25 is a diagram for one example of a semi-static pattern model for ePDCCH assignment of the present invention.

FIG. 25 is a diagram for one example of a semi-static pattern model for ePDCCH assignment of the present invention.

Referring to FIG. 25, interference from a femto cell can be reduced in a manner that ePDCCH of a macro victim UE (user equipment) is assigned to a vacant resource part to fit a pattern in the femto cell. An RB or time slot based semi-static pattern may be prepared for the ePDCCH assignment in the femto cell or a mixed type pattern may be formed. A specific pattern for preventing ePDCCH assignment to a corresponding fixed resource part can be formed to protect a previous common channel such as PBCH, PCH, SIB-1 and the like. A blank part in the drawing 9 means a resource part available for the ePDCCH assignment and a gray-colored part means a part for a femto to allocate a resource for its user. Since the configured state of the corresponding pattern may become scheduling information already known to a macro cell, interference can be reduced by user scheduling with reference to the corresponding information. And, the above contents are extensibly applicable to ePHICH. In case that an ABS pattern is used in a femto in a manner of being fixed, a pattern of ePDCCH is usable by being extensibly combined with ABS or ePDCCH may be configured to fit the ABS pattern irrespective of the additional ePDCCH pattern. In case that such signaling as X2 signaling, S1 signaling and the like is available in CSG environment, the schemes or methods of the inventions are extensibly applicable in non-CSG environment.

7. The General of Device for Implementing the Present Invention

Figure 26:
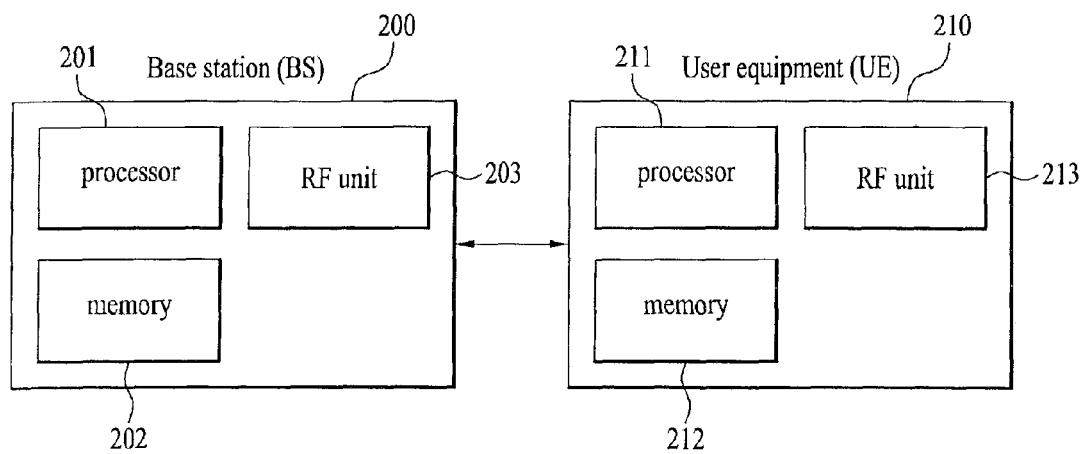
FIG. 26 is a block diagram for a configuration of a wireless communication device according to one embodiment of the present invention.

FIG. 26 is a block diagram for a configuration of a wireless communication device according to one embodiment of the present invention.

Referring to FIG. 26, a wireless communication system may include a base station (BS) 200 and a plurality of user equipments (UEs) 210 located within an area of the base station 200.

The base station 200 may include a processor 201, a memory 202 and an RF (radio frequency) unit 203. The processor 201 implements the proposed functions, processes and/or methods. Layers of a radio interface protocol can be implemented by the processor 201. The memory 202 is connected with the processor 201 and then stores various kinds of information to drive the processor 201. The RF unit 203 is connected with the processor 201 and then transmits and/or receives radio signals.

The user equipment 210 includes a processor 211, a memory 212 and an RF unit 213. The processor 211 implements the proposed functions, processes and/or methods. Layers of a radio interface protocol can be implemented by the processor 211. The memory 212 is connected with the processor 211 and then stores various kinds of information to drive the processor 211. The RF unit 213 is connected with the processor 211 and then transmits and/or receives radio signals.

The memory 202/212 may be provided within or outside the processor 201/211. And, the memory 202/212 may be connected with the processor 201/211 via various kinds of well-known means. Moreover, the base station 200 and/or the user equipment 210 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Although a data transceiving method in a wireless access system according to the present invention is described with reference to examples applied to 3GPP LTE system, it may be applicable to various kinds of wireless access systems as well as the 3GPP LTE system.

What is claimed is:

1. A method for transmitting a control channel, performed by a $1^{st}$ base station (BS) in a wireless communication system, the method comprising:
   receiving, from a $2^{nd}$ BS, allocation information on an E-PDCCH (enhanced-physical downlink control channel) for User Equipments (UEs) located at a cell boundary of the $2^{nd}$ BS;
   assigning an E-PDCCH for UEs located at a cell boundary of the $1^{st}$ BS using the received allocation information, wherein the E-PDCCH for the UEs located at the cell boundary of the $1^{st}$ BS is assigned on a resource which is orthogonal to a resource of the E-PDCCH for the UEs located at the cell boundary of the $2^{nd}$ BS; and transmitting allocation information on the E-PDCCH for the UEs located at the cell boundary of the $1^{st}$ BS to the $2^{nd}$ BS.

2. The method of claim 1, further comprising:
scheduling UEs located in a coverage area of the 1st BS except the UEs located at the cell boundary of the $1^{st}$ BS on a resource corresponding to the E-PDCCH for the UEs located at the cell boundary of the $2^{nd}$ BS.

3. The method of claim 1, wherein the allocation information on the E-PDCCH for the UEs located at the cell boundary of the $2^{nd}$ BS is received as a first bitmap of a resource block unit in a frequency domain or a second bitmap of a slot or subframe unit in a time domain.

4. The method of claim 3, wherein each of the bits of the first bitmap or the second bitmap is determined by using a corresponding measurement value.

5. The method of claim 4,
wherein if a RSRQ (Reference signal received quality) from the $2^{nd}$ BS is greater than γ, a bit of the first bitmap or the second bitmap is determined to be 0,
wherein if the RSRQ from the $2^{nd}$ BS is equal or less than γ, a bit of the first bitmap or the second bitmap is determined to be 1,
wherein "γ" is a specific threshold value.

6. The method of claim 1, wherein if the $1^{st}$ BS and the $2^{nd}$ BS comprise a macro BS and a pico BS, respectively, a pico BS based user equipment is located in an outer area of the pico BS and a macro BS based user equipment is located within the pico BS.

7. A method for transmitting a control channel, performed by a $1^{st}$ base station (BS) in a wireless communication system, the method comprising:
receiving, by RRC (radio resource control), allocation information on an E-PDCCH (enhanced-physical downlink control channel) for User Equipments (UEs) located at a cell boundary of the $2^{nd}$ BS; and
assigning an E-PDCCH for UEs located at a cell boundary of the $1^{st}$ BS using the received allocation information,
wherein the E-PDCCH for the UEs located at the cell boundary of the $1^{st}$ BS is assigned on a resource which is orthogonal to a resource of the E-PDCCH for the UEs located at the cell boundary of the $2^{nd}$ BS.

8. The method of claim 7, further comprising:
scheduling UEs located in a coverage area of the 1st BS except the UEs located at the cell boundary of the $1^{st}$ BS on a resource which is corresponding to the E-PDCCH for the UEs located at the cell boundary of the $2^{nd}$ BS.

9. A $1^{st}$ base station (BS), of which control channel is transmitted in a wireless communication system, comprising:
a radio frequency unit; and
a processor configured to control the radio frequency unit, the processor controlling the radio frequency unit to receive, from a $2^{nd}$ BS, allocation information on E-PDCCH (enhanced-physical downlink control channel) for User Equipments (UEs) located at a cell boundary of the $2^{nd}$ BS, the processor assigning an EPDCCH for UEs located at a cell boundary of the $1^{st}$ BS using the received allocation information,
wherein the E-PDCCH for the UEs located at the cell boundary of the $1^{st}$ BS is assigned on a resource which is orthogonal to a resource of the E-PDCCH for the UEs located at the cell boundary of the $2^{nd}$ BS, and the processor controlling the radio frequency unit to transmit allocation information on the E-PDCCH for the UEs located at the cell boundary of the $1^{st}$ BS to the $2^{nd}$ BS.

10. The $1^{st}$ BS of claim 9, wherein the processor schedules UEs located in a coverage area of the 1st BS except the UEs located at the cell boundary of the $1^{st}$ BS on a resource which is corresponding to the E-PDCCH for the UEs located at the cell boundary of the $2^{nd}$ BS.

11. The $1^{st}$ BS of claim 9, wherein the allocation information on the E-PDCCH for the UEs located at the cell boundary of the $2^{nd}$ BS is received as a first bitmap of a resource block unit in a frequency domain or a second bitmap of a slot or subframe unit in a time domain.

12. The $1^{st}$ BS of claim 11, wherein each of the bits of the first bitmap or the second bitmap is determined by using a corresponding measurement value.

13. The $1^{st}$ BS of claim 12,
wherein if a RSRQ (Reference signal received quality) from the $2^{nd}$ BS is greater than γ, a bit of the first bitmap or the second bitmap is determined to be 0,
wherein if the RSRQ from the $2^{nd}$ BS is equal or less than γ, a bit of the first bitmap or the second bitmap is determined to be 1,
wherein "γ" is a specific threshold value.

14. The $1^{st}$ BS of claim 9, wherein if the $1^{st}$ BS and the $2^{nd}$ BS comprise a macro BS and a pico BS, respectively, a pico BS based user equipment is located in an outer area of the pico BS and a macro BS based user equipment is located within the pico BS.

15. A $1^{st}$ base station (BS), of which control channel is transmitted in a wireless communication system, comprising:
a radio frequency unit; and
a processor configured to control the radio frequency unit, the processor controlling the radio frequency unit to receive, by RRC (radio resource control), allocation information on an E-PDCCH (enhanced-physical downlink control channel) for User Equipments (UEs) located at the cell boundary of the $2^{nd}$ BS, the processor assigning an E-PDCCH for UEs located at the cell boundary of the $1^{st}$ BS using the received allocation information,
wherein the E-PDCCH for the UEs located at the cell boundary of the $1^{st}$ BS is assigned on a resource which is orthogonal to a resource of the E-PDCCH for the UEs located at the cell boundary of the $2^{nd}$ BS.

16. The $1^{st}$ BS of claim 15, wherein the processor schedules UEs located in a coverage area of the 1st BS except the UEs located at the cell boundary of the $1^{st}$ BS on a resource which is corresponding to the E-PDCCH for the UEs located at the cell boundary of the $2^{nd}$ BS.

* * * * *